United States Patent
Mizuta et al.

(10) Patent No.: US 8,036,791 B2
(45) Date of Patent: Oct. 11, 2011

(54) VEHICULAR DAMPING FORCE CONTROL DEVICE

(75) Inventors: Yuichi Mizuta, Shizuoka-ken (JP); Motohiko Honma, Toyota (JP); Wataru Tanaka, Toyota (JP)

(73) Assignees: Toyota Jidosha Kabushiki Kaisha, Toyota-Shi (JP); Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 12/921,174

(22) PCT Filed: Feb. 10, 2009

(86) PCT No.: PCT/JP2009/052592
§ 371 (c)(1),
(2), (4) Date: Sep. 7, 2010

(87) PCT Pub. No.: WO2009/110300
PCT Pub. Date: Sep. 11, 2009

(65) Prior Publication Data
US 2011/0029198 A1 Feb. 3, 2011

(30) Foreign Application Priority Data
Mar. 7, 2008 (JP) .................................. 2008-057811

(51) Int. Cl.
*B60G 17/016* (2006.01)
*B60G 17/018* (2006.01)

(52) U.S. Cl. .......... 701/38; 701/37; 280/5.5; 280/5.501; 280/5.502; 280/5.506; 280/5.51; 280/5.512

(58) Field of Classification Search .................... 701/37, 701/38; 280/5.5, 5.501, 5.502, 5.506, 5.51, 280/5.512
See application file for complete search history.

(56) References Cited

U.S. PATENT DOCUMENTS

| 6,219,602 | B1 * | 4/2001 | Badenoch et al. ............... 701/37 |
| 7,813,853 | B2 * | 10/2010 | Tomida ........................... 701/37 |

(Continued)

FOREIGN PATENT DOCUMENTS

DE  4428605 A1 * 4/1995

(Continued)

OTHER PUBLICATIONS

Y. Yamamoto, H. Sakai, M. Ooki, K. Fukui, E. Yasuda, T. Sugawara, E. Ono, "Enhancement of Vehicle Dynamic Behavior Based on Visual and Motion Sensitivity (Second Report)," Avec 2006.

(Continued)

*Primary Examiner* — Thomas Black
*Assistant Examiner* — Peter D Nolan
(74) *Attorney, Agent, or Firm* — Gifford, Krass, Sprinkle, Anderson & Citkowski, P.C.

(57) ABSTRACT

A suspension ECU 13 calculates a target characteristic changing coefficient a_new for changing a target characteristic, which is represented by a quadratic function, by use of the maximum actual roll angle Φ_max generated in a vehicle body during the current turning state and a turning pitch angle Θ_fy_max which is a fraction of an actual pitch angle Θ generated as a result of turning, and changes the target characteristic by use of the coefficient a_new. Subsequently, the suspension ECU 13 calculates the difference ΔΘ between the actual pitch angle Θ and a target pitch angle Θh corresponding to the actual roll angle Φ on the basis of the changed target characteristic, and calculates a total demanded damping force F to be cooperatively generated by the shock absorbers so as to reduce the difference ΔΘ to zero. Furthermore, in proportion to the magnitude of a lateral acceleration Gl, the suspension ECU 13 distributes the total demanded damping force F into a demanded damping force Fi on the turning-locus inner side and a demanded damping force Fo on the turning-locus outer side.

12 Claims, 6 Drawing Sheets

U.S. PATENT DOCUMENTS

2004/0153226 A1 * 8/2004 Song .................................. 701/37
2010/0191420 A1 * 7/2010 Honma et al. .................. 701/38

FOREIGN PATENT DOCUMENTS

| JP | 6048147 | A | 2/1994 |
| JP | 6099714 | A | 4/1994 |
| JP | 11245641 | A | 9/1999 |
| JP | 2007008373 | A | 1/2007 |
| JP | 2009073415 | A | 4/2009 |
| WO | WO 2006126342 A1 * | | 11/2006 |

OTHER PUBLICATIONS

International Search Report for PCT/JP2009/052592 mailed May 19, 2009.

* cited by examiner

VEHICULAR DAMPING FORCE CONTROL DEVICE

TECHNICAL FIELD

The present invention relates to a vehicular damping force control device which changes and controls damping forces of shock absorbers disposed between a vehicle body and wheels.

BACKGROUND ART

Conventionally, there have been actively proposed apparatuses and methods for changing and controlling damping forces of shock absorbers disposed between a vehicle body and wheels. For example, Japanese Patent Application Laid-Open (kokai) No. 2007-8373 discloses a suspension characteristic computation method which provides a guideline for designing suspensions in consideration of a correlation between roll and pitch generated in the vehicle body. In this suspension characteristic computation method, a vertical force on a front-wheel side is computed from the product of a geometry proportionality coefficient on the front-wheel side and the square of a tire lateral force, and a vertical force on a rear-wheel side is computed from the product of a geometry proportionality coefficient on the rear-wheel side and the square of a tire lateral force. The sum of the two vertical forces is computed as a pitch moment attributable to the geometry of suspensions. Meanwhile, a pitch moment attributable to damping forces of the suspensions is computed from the product of a damping force proportionality coefficient and a roll rate. Subsequently, a pitch angle is computed from the product of the sum of the computed two pitch moments and the gain and phase delay of the pitch angle in relation to the pitch moment. The phase difference between the pitch angle and the roll angle is then computed from the computed pitch angle.

In the case where suspensions are designed in accordance with such a suspension characteristic computation method, timings at which a roll and a pitch are generated, respectively, can be synchronized, by means of, for example, properly setting an extension difference or a contraction difference between shock absorbers provided on the front-wheel side and those provided on the rear-wheel side. As a result, maneuvering stability can be improved.

Further, Japanese Patent Application Laid-Open (kokai) No. H6-99714 discloses a vehicular suspension apparatus which can perform active roll suppression control in accordance with the roll direction of the vehicle body by use of only a steering sensor. In this vehicular suspension apparatus, when a steering angle detected by a steering sensor exceeds a predetermined neutral threshold value, the control state of shock absorbers is switched to a roll control state in which left and right shock absorbers are controlled to produce larger damping forces in the expansion or contraction direction in accordance with the roll direction of the vehicle body determined from the sign of a steering angular speed. Subsequently, when the sign of the steering angular speed is reversed due to reverse steering, the left and right shock absorbers are controlled such that the shock absorbers produce larger damping forces in directions opposite the directions in which they have produced larger damping forces in the above-described roll control state.

Furthermore, Japanese Patent Application Laid-Open (kokai) No. H6-48147 discloses a vehicular suspension apparatus which suppresses rolling due to abrupt steering and prevents riding quality from deteriorating at the time of steering. In this vehicular suspension apparatus, a control signal is calculated from a bounce rate based on sprung-portion ascending/descending speed, a pitch rate detected from a difference in sprung-portion ascending/descending speed between the front and rear sides of the vehicle body, and a roll rate detected from a difference in sprung-portion ascending/descending speed between the left and right sides of the vehicle body. When the control signal is equal to or greater than a predetermined large threshold, the damping forces of shock absorbers on the expansion side (on the side toward a steering direction) are increased, and the damping forces of shock absorbers on the contraction side (on the side opposite the steering direction) are decreased. When the control signal is equal to or less than a predetermined small threshold, the damping forces of shock absorbers on the expansion side are decreased, and the damping forces of shock absorbers on the contraction side are increased.

Furthermore, Japanese Patent Application Laid-Open (kokai) No. H11-245641 discloses a roll control apparatus for a vehicle which prevents riding quality from deteriorating during high speed turning because of roll control. This roll control apparatus detects a lateral gravitational acceleration which acts on the vehicle during traveling, and switches and controls shock absorbers to produce damping forces in a direction for suppressing rolling of the vehicle, when the lateral gravitational acceleration exceeds a previously set threshold value.

DISCLOSURE OF THE INVENTION

Incidentally, it is generally said that, in order to secure maneuvering stability during turning of a vehicle, as taught in Japanese Patent Application Laid-Open No. 2007-8373, the timing of generation of a roll and the timing of generation of a pitch are desired to be synchronized with each other, and the vehicle is desired to have such a pitch angle that the vehicle body tilts forward slightly. Furthermore, in general, when a vehicle turns, as taught in Japanese Patent Application Laid-Open Nos. H6-99714, H6-48147, and H11-245641, damping forces of shock absorbers disposed on the turning-locus inner side (the inner side in relation to a turning locus) of the vehicle are increased and damping forces of shock absorbers disposed on the turning-locus outer side (the outer side in relation to the turning locus) of the vehicle are decreased, whereby the posture of the vehicle is controlled so as to lower a sprung portion (i.e., the vehicle body) of the vehicle.

However, in the case where, in response to a change in the actual roll angle, the actual pitch angle is changed in accordance with a predetermined target characteristic in order to synchronize the timing of generation of a roll and the timing of generation of a pitch as taught in, for example, Japanese Patent Application Laid-Open No. 2007-8373, depending on the actual characteristic in a turning state, the actual pitch angle cannot be changed in accordance with the predetermined target characteristic. Here, there is assumed a case where, in response to a change in the actual roll angle, a target pitch angle is determined on the basis of the predetermined target characteristic, and the damping forces of shock absorbers are changed as taught in Japanese Patent Application Laid-Open Nos. H6-99714, H6-48147, and H11-245641. In such a case, in a state in which the actual pitch angle determined by the actual characteristic is always smaller than the target pitch angle determined by the target characteristic; in particular, in a state in which the actual pitch angle at the time when the actual roll angle decreases is smaller than the target pitch angle, there is a possibility that, even when the damping forces of the shock absorbers are changed, the actual pitch angle cannot be changed to the target pitch angle.

The above-described case will be described specifically. In general, in a situation where the actual roll angle of the vehicle body generated as a result of turning is decreasing toward the end of turning, the target pitch angle and the actual pitch angle tend to decrease until the vehicle body tilts forward slightly. Meanwhile, depending on the number of vehicle occupants and the amount of loads, there may occur a situation where the actual pitch angle generated in the vehicle body is always small as compared with the target pitch angle. In such a case, although both the target pitch angle and the actual pitch angle tend to decrease with the actual roll angle, the actual pitch angle must be first increased and then decreased so that the actual pitch angle approaches the target pitch angle. In such a case, the control of changing the damping forces of the shock absorbers must satisfy both the requirement of increasing the actual pitch angle and the requirement of decreasing the actual pitch angle. Therefore, the above-described control is not realistic in particular in the case where the shock absorbers employ a scheme of passively controlling the damping forces. Moreover, even if the requirement of increasing the actual pitch angle and the requirement of decreasing the actual pitch angle can be satisfied through changing the damping forces of the shock absorbers, the possibility of deterioration of phase characteristics associated with the above-described generation timings of a roll and a pitch is high, and, in some cases, satisfactory maneuvering stability cannot be secured during turning of the vehicle.

The present invention has been accomplished so as to solve the above-described problems, and its object is to provide a vehicular damping force control device which can control posture changing behavior on the basis of a target characteristic determined in consideration of an actual characteristic during turning of a vehicle.

In order to achieve the above-described object, the present invention provides a vehicular damping force control device which changes and controls damping forces of shock absorbers disposed between a vehicle body and wheels, characterized by comprising physical quantity detection means for detecting a predetermined physical quantity which changes with turning of the vehicle; posture-state-quantity detection means for detecting an actual roll angle generated in a lateral direction of the vehicle body and an actual pitch angle generated in a longitudinal direction of the vehicle body; target-characteristic-changing-coefficient calculation means for calculating a target characteristic changing coefficient for changing a target characteristic in accordance with an actual characteristic of the vehicle represented by the actual roll angle and the actual pitch angle detected by the posture-state-quantity detection means, the target characteristic representing a relation between roll angle and pitch angle for controlling rolling behavior of the vehicle body and determined such that the pitch angle changes quadratically with the roll angle; target characteristic changing means for changing the target characteristic by use of the target characteristic changing coefficient calculated by the target-characteristic-changing-coefficient calculation means; total-damping-force calculation means for calculating, on the basis of the target characteristic changed by the target characteristic changing means, a total damping force which must be cooperatively generated by left and right shock absorbers disposed on a front-wheel side of the vehicle and left and right shock absorbers disposed on a rear-wheel side of the vehicle; total-damping-force distribution means for distributing the total damping force calculated by the total-damping-force calculation means to the shock absorbers disposed on a turn-locus inner side and the shock absorbers disposed on a turn-locus outer side in accordance with the predetermined physical quantity detected by the physical quantity detection means; and damping force control means for changing and controlling the damping forces of the shock absorbers on the basis of the damping forces distributed by the total-damping-force distribution means to the shock absorbers disposed on the turn-locus inner side and the shock absorbers disposed on the turn-locus outer side.

In this case, preferably, the predetermined physical quantity detected by the physical quantity detection means is at least one of a lateral acceleration generated as a result of turning of the vehicle, a yaw rate generated as a result of turning of the vehicle, an amount of operation of a steering wheel operated by a driver. Preferably, each shock absorber includes an electrical actuator whose operation is electrically controlled so as to change the damping force of the shock absorber, and the damping force control means changes and controls the damping force of each shock absorber by electrically controlling the operation of the electrical actuator.

Furthermore, in this case, preferably, the total-damping-force calculation means determines a target pitch angle corresponding to the actual roll angle detected by the posture-state-quantity detection means on the basis of the target characteristic changed by the target characteristic changing means; calculates a difference between the determined target pitch angle and the actual pitch angle detected by the posture-state-quantity detection means; and, in order to control rolling behavior of the vehicle body by synchronizing phases of the actual roll angle and the pitch angle, calculates the total damping force, which must be cooperatively generated by the left and right shock absorbers disposed on the front-wheel side and the left and right shock absorbers disposed on the rear-wheel side, such that the calculated difference becomes about zero.

By virtue of these configurations, the target characteristic for controlling rolling behavior of the vehicle body which occurs during turning of the vehicle by synchronizing the phases of the actual roll angle and the pitch angle of the vehicle body can be changed by use of the target characteristic changing coefficient calculated in accordance with the actual characteristic of the vehicle in a turning state; and the total damping force, which must be cooperatively generated by the left and right shock absorbers disposed on the front-wheel side of the vehicle and the left and right shock absorbers disposed on the rear-wheel side of the vehicle, can be calculated on the basis of the changed target characteristic. Then, the total damping force can be distributed in accordance with the magnitude of the predetermined physical quantity (lateral acceleration, yaw rate, steering wheel operation amount, etc.), which changes as a result of turning of the vehicle, so as to control the damping force of each shock absorber.

More specifically, the target-characteristic-changing-coefficient calculation means can calculate the target characteristic changing coefficient which is used to change the target characteristic, in which the pitch angle changes quadratically changes with the roll angle, in accordance with the actual characteristic represented by the actual roll angle and the actual pitch angle detected by the posture-state-quantity detection means (such that the actual characteristic is reflected on the target characteristic changing coefficient). The target characteristic changing means can change the target characteristic by use of the calculated target characteristic changing coefficient. With this operation, the target characteristic can be changed properly such that the actual characteristic generated as a result of turning of the vehicle is reflected on the target characteristic.

The total-damping-force calculation means can calculate the total damping force, which must be cooperatively generated by the left and right shock absorbers disposed on the front and rear sides, on the basis of the changed target characteristic. In this case, the total-damping-force calculation means can determine the target pitch angle corresponding to the actual roll angle on the basis of the changed target characteristic, and can calculate the total damping force such that the difference between the target pitch angle and the actual pitch angle becomes about zero. The total-damping-force distribution means can distribute this total damping force to the shock absorbers on the turning-locus inner side and the shock absorbers on the turning-locus outer side in accordance with the predetermined physical quantity.

After the total-damping-force distribution means distributes the total damping force to the shock absorbers on the turning-locus inner side and the shock absorbers on the turning-locus outer side, the damping force control means can electrically control the electrical actuator provided on each shock absorber. With this operation, the shock absorbers disposed on the turning-locus inner side and the shock absorbers disposed on the turning-locus outer side can generate the respective determined damping forces.

By virtue of this operation, in a situation where the actual roll angle increases, the target pitch angle can be set to be greater than the actual pitch angle. Accordingly, the damping forces of the shock absorbers disposed on the front-wheel side can be changed to decrease relatively such that the actual pitch angle changes in agreement with the changing trend of the target pitch angle which increases with the actual roll angle (the trend of tilting forward to a greater degree); in other words, the actual pitch angle increases toward the target pitch angle as the actual roll angle increases. Meanwhile, in a situation where the actual roll angle decreases, the target pitch angle can be set to be smaller than the actual pitch angle. Accordingly, the damping forces of the shock absorbers disposed on the front-wheel side can be changed to increase relatively such that the actual pitch angle changes in agreement with the changing trend of the target pitch angle which decreases with the actual roll angle (the trend of returning to the horizontal posture); in other words, the actual pitch angle decreases toward the target pitch angle as the actual roll angle decreases.

With this operation, the damping forces of the shock absorbers can be changed by means of realistic changing control, and the actual pitch angle can be changed toward the target pitch angle without fail. Furthermore, since the actual pitch angle can be changed in agreement with the changing trend of the target pitch angle for a change in the actual roll angle, the phase difference between the generation timings of a roll and a pitch can be reduced, and satisfactory maneuvering stability can be secured when the vehicle turns.

According to another feature of the present invention, the target-characteristic-changing-coefficient calculation means calculates the target characteristic changing coefficient by use of the maximum actual roll angle and the maximum actual pitch angle detected by the posture-state-quantity detection means during the current turning of the vehicle. More specifically, the vehicular damping force control device further comprises longitudinal acceleration detection means for detecting acceleration in the longitudinal direction generated in the vehicle body; brake-drive-pitch-angle determination means for determining, from the acceleration in the longitudinal direction of the vehicle body detected by the longitudinal acceleration detection means, a brake-drive pitch angle in the longitudinal direction of the vehicle body which has a predetermined relation with the acceleration in the longitudinal direction generated in the vehicle body, which is a faction of the actual pitch angle generated in the vehicle body, and which is generated as a result of the vehicle being braked or driven; turning-pitch-angle calculation means for calculating a turning pitch angle in the longitudinal direction of the vehicle body by subtracting the brake-drive pitch angle determined by the brake-drive-pitch-angle determination means from the actual pitch angle detected by the posture-state-quantity detection means, the turning pitch angle being generated as a result of turning of the vehicle and being a fraction of the actual pitch angle generated in the vehicle body, wherein the target-characteristic-changing-coefficient calculation means calculates the target characteristic changing coefficient by use of the maximum turning pitch angle calculated by the turning-pitch-angle calculation means during the current turning of the vehicle.

By virtue of these configurations, the target-characteristic-changing-coefficient calculation means can calculates the target characteristic changing coefficient by use of the maximum actual roll angle and the maximum actual pitch angle detected by the posture-state-quantity detection means during the current turning of the vehicle; specifically, such that a curve representing the quadratically changing target characteristic passes though a point determined by the maximum actual roll angle and the maximum actual pitch angle on coordinates of the pitch angle and the roll angle which determine the quadratically changing target characteristic. Thus, it becomes possible to calculate the target characteristic changing coefficient such that the actual characteristic in the current turning state of the vehicle is reflected on the target characteristic changing coefficient more accurately, to thereby change the target characteristic more accurately.

Moreover, as to the maximum actual pitch angle used by the target-characteristic-changing-coefficient calculation means, the brake-drive-pitch-angle determination means determines the brake-drive pitch angle by use of the longitudinal acceleration detected by the longitudinal acceleration detection means; and the turning-pitch-angle calculation means calculates the turning pitch angle by subtracting the brake-drive pitch angle from the actual pitch angle; and the maximum value of the turning pitch angle is used. With this operation, it becomes possible to calculate the target characteristic changing coefficient, while eliminating changes in the actual pitch angle of the vehicle body stemming from braking/driving of the vehicle; in other words, in consideration of only the actual pitch angle generated as a result of turning. Accordingly, the target characteristic changing coefficient can be calculated such that the actual characteristic in the current turning state of the vehicle is quite accurately reflected on the target characteristic changing coefficient. In addition, it is possible to reliably prevent the control of rolling behavior from being affected by braking/driving in the turning state. Moreover, since the target characteristic changing coefficient can be calculated such that the actual characteristic in the turning state is quite accurately reflected on the target characteristic changing coefficient, a more proper target characteristic can be set by means of repeatedly learning (updating) the target characteristic changing coefficient.

According to another feature of the present invention, the target-characteristic-changing-coefficient calculation means calculates the target characteristic changing coefficient when the predetermined physical quantity detected by the physical quantity detection means is equal to or greater than a preset, predetermined value. By virtue of this configuration, when the predetermined physical quantity (lateral acceleration, yaw rate, steering wheel operation amount, etc.) detected in relation to the generation of rolling behavior is equal to or greater than a preset, predetermined value, the target-characteristic-changing-coefficient calculation means can calculate the target characteristic changing coefficient. Therefore, as compared with the case where the determination as to whether to calculate the target characteristic changing coefficient is made on the basis of the magnitude of the actual roll angle which varies among vehicles and varies depending on the number of vehicle occupants or the amount of loads, the determination as to whether to calculate the target characteristic changing coefficient can be made more properly. Moreover, the target characteristic changing coefficient is calculated when the predetermined physical quantity is equal to or greater than the predetermined value. Therefore, in an example case where the rolling behavior of the vehicle body is small and the SN ratio of a signal representing the detection value is small; that is, the strength of noise contained in the signal is large, it is possible to prevent the target-characteristic-changing-coefficient calculation means from calculating the target characteristic changing coefficient. Thus, inaccurate calculation of the target characteristic changing coefficient can be prevented.

According to another feature of the present invention, there are provided roll angle estimation means for estimating a roll angle in the lateral direction of the vehicle body generated as a result of a driver's steering operation for turning the vehicle, and vertical acceleration detection means for detecting acceleration in the vertical direction generated in the vehicle body, wherein the target-characteristic-changing-coefficient calculation means does not calculates the target characteristic changing coefficient when the absolute value of a difference between the roll angle estimated by the roll angle estimation means and the actual roll angle detected by the posture-state-quantity detection means is equal to or greater than a preset, predetermined value or when the absolute value of the acceleration in the vertical direction of the vehicle body detected by the vertical acceleration detection means is equal to or greater than a preset, predetermined value.

By virtue of this configuration, it is possible to properly eliminate control performed for a rolling behavior caused by a vertical input from a road surface and to cause the target-characteristic-changing-coefficient calculation means to calculate the target characteristic changing coefficient when a rolling behavior occurs as a result of turning of the vehicle. Thus, the target-characteristic-changing-coefficient calculation means is prevented from calculating the target characteristic changing coefficient in consideration of the influence of useless rolling behavior. Accordingly, a more proper target characteristic can be set by means of repeatedly learning (updating) the target characteristic changing coefficient.

Moreover, according to another feature of the present invention, there is provided actual-characteristic-change determination means for determining whether or not the vehicle starts to travel and enters a state in which the actual roll angle and the actual pitch angle detected by the posture-state-quantity detection means are likely to change, wherein, when the actual-characteristic-change determination mean determines that the vehicle is in a state in which the actual characteristic of the vehicle is likely to change, the target characteristic changing means increases the frequency at which the target characteristic is changed by use of the target characteristic changing coefficient calculated by the target-characteristic-changing-coefficient calculation means. In this case, preferably, the actual-characteristic-change determination means determines that the vehicle is in a state in which the actual roll angle and the actual pitch angle are likely to change, when a period of time elapsed after an ignition switch of the vehicle was turned on is equal to less than a preset, predetermined elapse time, when the target characteristic changing means has not yet changed the target characteristic after a trunk lid of the vehicle was opened and closed, or when the target characteristic changing means has not yet changed the target characteristic after a door of the vehicle was opened and closed.

By virtue of these configurations, the changing frequency of the target characteristic can be increased in a situation where the actual characteristic represented by the actual roll angle and the actual pitch angle is likely to change; for example, a situation where a predetermined period of time has not yet elapsed after the ignition switch was turned on, a situation where the trunk lid was opened and closed and the amount of loads is highly likely to change, or a situation where a door was opened and closed and the number of vehicle occupants is highly likely to change. With this operation, even when the actual characteristic changes, the target characteristic changing coefficient corresponding to the changed actual characteristic (the actual roll angle and the actual pitch angle) can be changed repeatedly. Therefore, the target characteristic can be changed such that the changed actual characteristic is well reflected on the target characteristic. Moreover, robustness can be enhanced by increasing the changing frequency of the target characteristic in accordance with the state of the vehicle and repeatedly learning (updating) the calculated target characteristic changing coefficient, whereby a more proper target characteristic can be set.

According to another feature of the present invention, the total-damping-force distribution means distributes the total damping force calculated by the total-damping-force calculation means in proportion to the predetermined physical quantity detected by the physical quantity detection means such that the damping forces of the shock absorbers disposed on the turning-locus inner side become greater than the damping forces of the shock absorbers disposed on the turning-locus outer side. In this case, more specifically, the total-damping-force distribution means distributes the total damping force calculated by the total-damping-force calculation means equally to the shock absorbers disposed on the turning-locus inner side and the shock absorbers disposed on the turning-locus outer side; adds to the damping forces of the shock absorbers disposed on the turning-locus inner side a damping force distribution amount which is proportional to the predetermined physical quantity detected by the physical quantity detection means; and subtracts the damping force distribution amount from the damping forces of the shock absorbers disposed on the turning-locus outer side, whereby the damping forces of the shock absorbers disposed on the turning-locus inner side are made greater than the damping forces of the shock absorbers disposed on the turning-locus outer side.

By virtue of these configurations, the total damping force required to control the rolling behavior can be distributed in proportion to the magnitude of the predetermined physical quantity such that the damping forces of the shock absorbers disposed on the turning-locus inner side become greater than the damping forces of the shock absorbers disposed on the turning-locus outer side. At that time, a distribution amount which is proportional to the magnitude of the predetermined physical quantity is calculated, the calculated distribution amount is added to the damping forces of the shock absorbers disposed on the turning-locus inner side to which the total damping force is equally distributed, and the calculated distribution amount is subtracted from the damping forces of the shock absorbers disposed on the turning-locus outer side to which the total damping force is equally distributed, whereby the damping forces of the shock absorbers disposed on the turning-locus inner side can be made greater than the damping forces of the shock absorbers disposed on the turning-locus outer side.

With this operation, the damping forces which must be generated by the shock absorbers disposed on the turning-locus inner side and the shock absorbers disposed on the turning-locus outer side can be determined very accurately. Moreover, through addition and subtraction of the distribution amount which is proportional to the predetermined physical quantity, it is possible to maintain a state in which, while the left and right absorbers disposed on the front-wheel side generate the demanded total damping force, the shock absorbers disposed on the turning-locus inner side generate damping forces greater than the damping forces of the shock absorbers disposed on the turning-locus outer side so as to control the rolling behavior. Accordingly, the rolling behavior can be controlled more accurately by making constant the posture changing behavior of the vehicle during turning, whereby the maneuvering stability of the vehicle can be improved greatly.

BEST MODE FOR CARRYING OUT THE INVENTION

Figure 1:
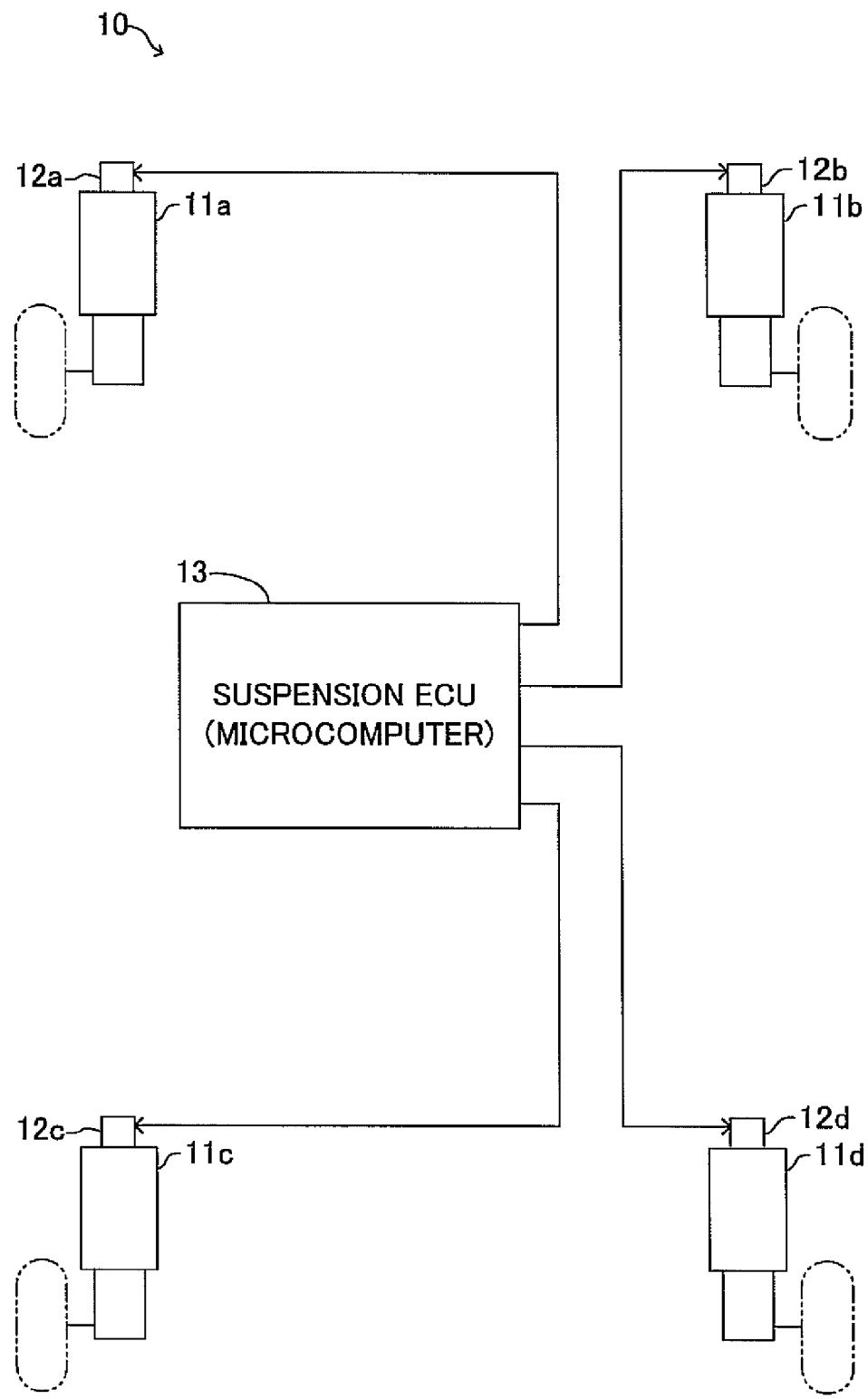
FIG. 1 is a schematic diagram showing the configuration of a vehicular damping force control device according to an embodiment of the present invention.

A vehicular damping force control device according to an embodiment of the present invention will now be described in detail with reference to the drawings. FIG. 1 schematically shows the configuration of a vehicular damping force control device 10 according to the embodiment of the present invention. This vehicular damping force control device 10 includes shock absorbers 11a, 11b, 11c, and 11d which connect a vehicle body and wheels (left and right front wheels and left and right rear wheels) of the vehicle.

The shock absorbers 11a, 11b, 11c, and 11d include rotary valves (electrical actuators) 12a, 12b, 12c, and 12d, each of which changes seamlessly, for example, the diameter of a flow path for working fluid (oil, high-pressure gas, etc.). Although detailed description will be omitted, each of the rotary valves 12a, 12b, 12c, and 12d includes an unillustrated electrical drive means (e.g., an electric motor, a solenoid, or the like). A suspension control unit 13 (hereinafter simply referred to as a suspension "ECU 13") electrically controls the rotary valves 12a, 12b, 12c, and 12d so as to change the diameters of the corresponding flow paths for the working fluid, to thereby seamlessly change the damping force characteristics of the shock absorbers 11a, 11b, 11c, and 11d.

The suspension ECU 13 is a microcomputer which includes a CPU, ROM, RAM, timers, etc., as main components. The suspension ECU 13 changes the damping forces of the shock absorbers 11a, 11b, 11c, and 11d, when necessary, by executing various programs, including a roll control program to be described later.

Figure 2:
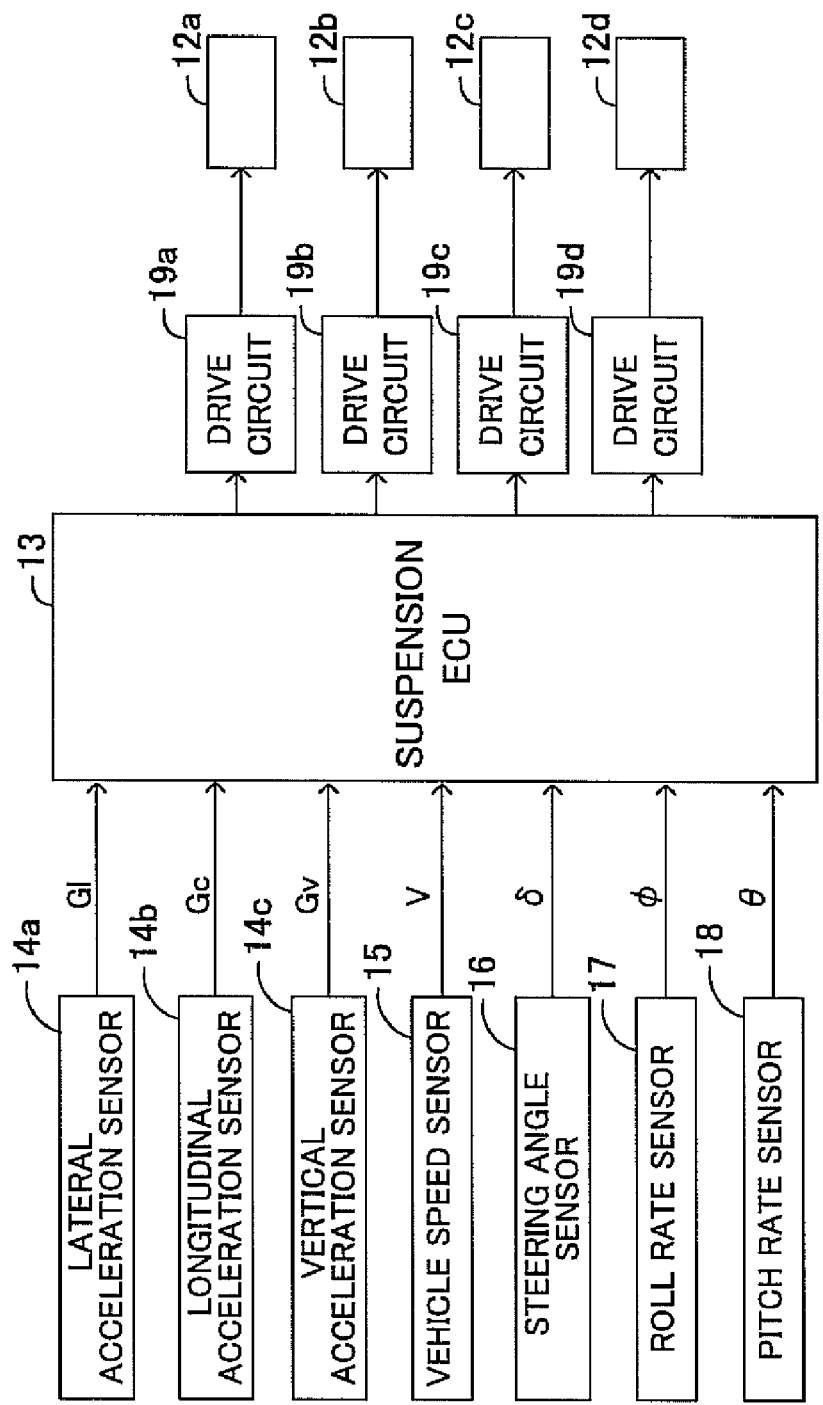
FIG. 2 is an explanatory view showing the connection between a suspension ECU of FIG. 1 and various sensors and drive circuits.

In order to control the damping forces of the shock absorbers 11a, 11b, 11c, and 11d through execution of the programs as described above, various sensors are connected to the input side of the suspension ECU 13 as shown in FIG. 2. The sensors include a lateral acceleration sensor 14a, a longitudinal acceleration sensor 14b, a vertical acceleration sensor 14c, a vehicle speed sensor 15, a steering angle sensor 16, a role rate sensor 17, and a pitch rate sensor 18. The role rate sensor 17 and the pitch rate sensor 18 constitute posture-state-quantity detection means.

The lateral acceleration sensor 14a is configured detect lateral acceleration Gl which is generated in the lateral direction of the vehicle body and which is a predetermined physical quantity changing as a result of turning of the vehicle, and output the detected lateral acceleration Gl to the suspension ECU 13. The longitudinal acceleration sensor 14b is configured to detect lateral acceleration Gc which is generated in the longitudinal direction of the vehicle body, and output the detected longitudinal acceleration Gc to the suspension ECU 13. The vertical acceleration sensor 14c is configured to detect vertical acceleration Gv which is generated in the vertical direction of the vehicle body, and output the detected vertical acceleration Gv to the suspension ECU 13. The vehicle speed sensor 15 is configured to detect vehicle speed V of the vehicle, and output the detected vehicle speed V to the suspension ECU 13. The steering angle sensor 16 is configured to detect an amount of rotational operation of an unillustrated steering wheel as a steering angle $\delta$, and output the detected steering angle $\delta$ to the suspension ECU 13. The role rate sensor 17 is configured to detect roll angular speed $\phi$ generated as a result of rolling behavior of the vehicle body, and output the detected roll angular speed $\phi$ to the suspension ECU 13. The pitch rate sensor 18 is configured to detect pitch angular speed $\theta$ generated as a result of pitching behavior of the vehicle body, and output the detected pitch angular speed $\theta$ to the suspension ECU 13.

In general, respective values detected by the lateral acceleration sensor 14a, the longitudinal acceleration sensor 14b, the vertical acceleration sensor 14c, the steering angle sensor 16, the role rate sensor 17, and the pitch rate sensor 18 are each handled as a value with a positive or negative sign. However, if the present embodiment is described in consideration of the signs of the detected values, the description becomes complicated. Therefore, in the following description, the detected values will be handled as absolute values unless otherwise specified.

In the present embodiment, the roll angular speed $\phi$ and the pitch angular speed $\theta$ are detected by the roll rate sensor 17 and the pitch rate sensor 18. However, no limitation is imposed on the method of obtaining the roll angular speed $\phi$ and the pitch angular speed $\theta$. In the case where the vehicle is equipped with unillustrated stroke sensors which detect respective stroke amounts of the shock absorbers 11a, 11b, 11c, and 11d, instead of directly detecting the roll angular speed $\phi$ and the pitch angular speed $\theta$ on the basis of behavior of the vehicle, the roll angular speed $\phi$ and the pitch angular speed $\theta$ may be calculated from the stroke amounts detected by the stroke sensors. Alternatively, the roll angular speed $\phi$ and the pitch angular speed $\theta$ may be calculated from the lateral acceleration Gl, the longitudinal acceleration Gc, and the vertical acceleration Gv detected by the lateral acceleration sensor 14a, the longitudinal acceleration sensor 14b, and the vertical acceleration sensor 14c, respectively.

Meanwhile, as shown in FIG. 2, drive circuits 19a, 19b, 19c, and 19d for controlling operations of the rotary valves 12a, 12b, 12c, and 12d are connected to the output side of the suspension ECU 13. This configuration enables the suspension ECU 13 to control the damping force characteristics of the shock absorbers 11a, 11b, 11c, and 11d.

Next, operation of the vehicular damping force control device 10 having the above-described configuration will be described in detail.

Figure 3:
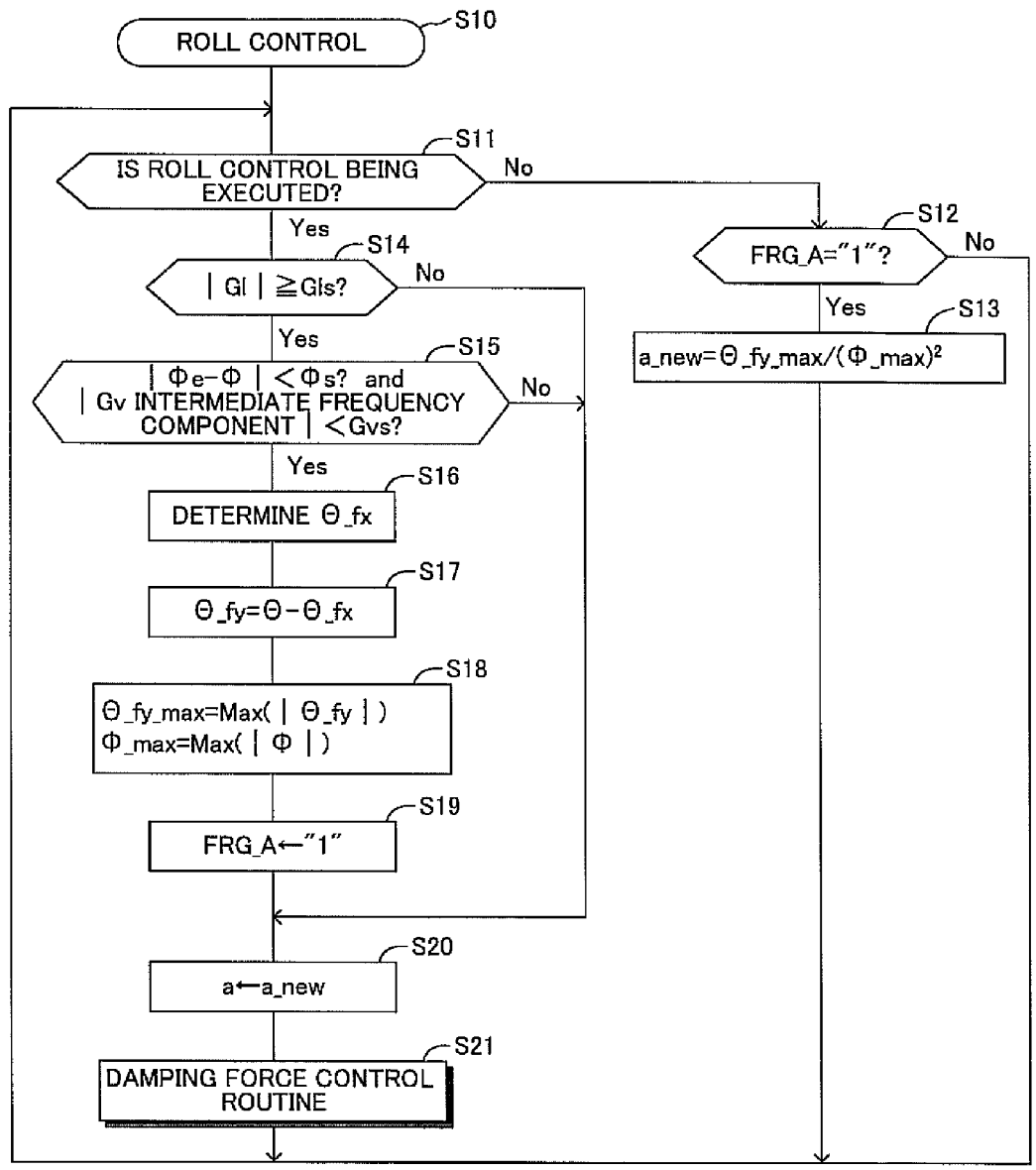
FIG. 3 is a flowchart of a roll control program executed by the suspension ECU of FIG. 1.

When a driver turns an unillustrated ignition switch on, the suspension ECU 13 executes a predetermined initialization program which is not shown, and then repeatedly executes a roll control program shown in FIG. 3 at preset short intervals. Specifically, in step S10, the suspension ECU 13 starts the roll control program, and, in step S11 subsequent thereto, the suspension ECU 13 determines whether or not roll control (more specifically, damping force control for the shock absorbers 11a, 11b, 11c, and 11d), which will be described later, is presently being executed. If the roll control is not executed at the time of present execution of step S11, the suspension ECU 13 makes a "No" determination, and proceeds to step S12. Notably, in the determination processing of step S11, the suspension ECU 13 determines that the roll control is being executed, for example, when the detected lateral acceleration Gl or the detected steering angle δ is changing, except for the case to be described later. The suspension ECU 13 then executes step S14 and subsequent steps.

In step S12, the suspension ECU 13 determines whether or not the set value of a change permission flag FRG_A is "1." The change permission flag FRG_A is used to permit changing of a target characteristic changing coefficient a, which will be described in detail later. The set value "1" of the change permission flag FRG_A represents that changing (calculation) of the target characteristic changing coefficient a is permitted. That is, if the set value of the change permission flag FRG_A is "0," which represents that changing (calculation) of the target characteristic changing coefficient a is not permitted, the suspension ECU 13 makes a "No" determination, and returns to step S11. Meanwhile, if the set value of the change permission flag FRG_A is "1," the suspension ECU 13 makes a "Yes" determination, and proceeds to step S13.

In step S13, the suspension ECU 13 calculates a new target characteristic changing coefficient a (hereinafter, this new target characteristic changing coefficient a will be referred to as the "target characteristic changing coefficient a_new") corresponding an actual characteristic of the vehicle represented by the rolling behavior and the pitching behavior currently generated in the vehicle body; more specifically, the actual roll angle Φ and the actual pitch angle Θ. In the below, the calculation of the target characteristic changing coefficient a_new will be described in detail.

It is generally said that, in order to improve maneuvering stability during turning of the vehicle, it is effective to maintain the vehicle body in a turning state in a forward tilted posture, and synchronize the generation timings of a rolling behavior and a pitching behavior of the vehicle body. That is, in the case of a vehicle which is excellent in maneuvering stability in a turning state, a roll and a pitch tend to be generated in the vehicle body at substantially the same time. Meanwhile, in the case of a vehicle which is poor in maneuvering stability in a turning state, a roll and a pitch tend to be generated in the vehicle body with a time difference therebetween. This means that the higher the maneuvering stability of the vehicle in a turning state, the smaller the phase difference between the actual roll angle Φ and the actual pitch angle Θ of the vehicle body.

That is, in the case of a vehicle which is excellent in maneuvering stability, the actual pitch angle Θ and the actual roll angle Φ have phase characteristics such that the actual pitch angle Θ has a very small hysteresis for a change in the actual roll angle Φ. Meanwhile, in the case of a vehicle which is poor in maneuvering stability, the actual pitch angle Θ and the actual roll angle Φ have phase characteristics such that the actual pitch angle Θ has a large hysteresis for a change in the actual roll angle Φ. Incidentally, in general, a vehicle in a turning state travels, while lowering the sprung portion (i.e., the vehicle body) on the turning-locus outer side, to thereby generate an actual roll angle Φ attributable to the rolling behavior. Accordingly, in order to attain satisfactory maneuvering stability for a change in the generated actual roll angle Φ, controlling the actual pitch angle Θ is effective.

Figure 4:
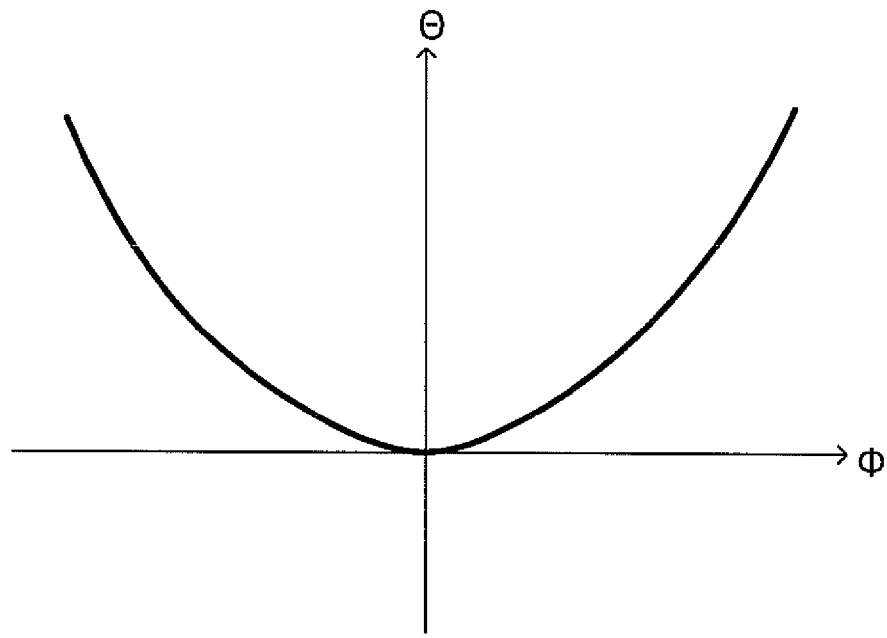
FIG. 4 is a graph showing a target characteristic represented by roll angle and pitch angle.

In order to improve maneuvering stability of the vehicle by means of controlling the pitch angle Θ for a change in the roll angle Φ as described above, a correlation between the roll angle Φ and the pitch angle Θ, which is represented by a quadratic function as shown in FIG. 4, is employed as a target characteristic. If the actual pitch angle Θ of the vehicle body in a turning state can be rendered coincident with (can be caused to approach) a target pitch angle Θh which is determined from the target characteristic and corresponds to the actual roll angle Φ of the vehicle body, satisfactory maneuvering stability can be secured. However, even in the case where the same vehicle turns in the same manner, the actual roll angle Φ and the actual pitch angle Θ generated in the vehicle body may change depending on, for example, the number of vehicle occupants or the amount of loads.

In such a case, if the target characteristic is previously set such that the target characteristic cannot be changed, the target characteristic deviates from the actual characteristic of the vehicle represented by the actual roll angle Φ and the actual pitch angle Θ, and, in some case, the actual pitch angle Θ cannot be controlled to follow or approach the target pitch angle Θh. This will be described specifically with reference to FIG. 5. Here, a state is assumed in which, as indicated by a broken line, the actual characteristic at the time when the actual roll angle Φ increases is located below the target characteristic indicated by a solid line. In such a case, in order to secure maneuvering stability, the actual pitch angle Θ must be increased so that the actual pitch angle Θ approaches the target pitch angle Θh in the target characteristic.

Figure 5:
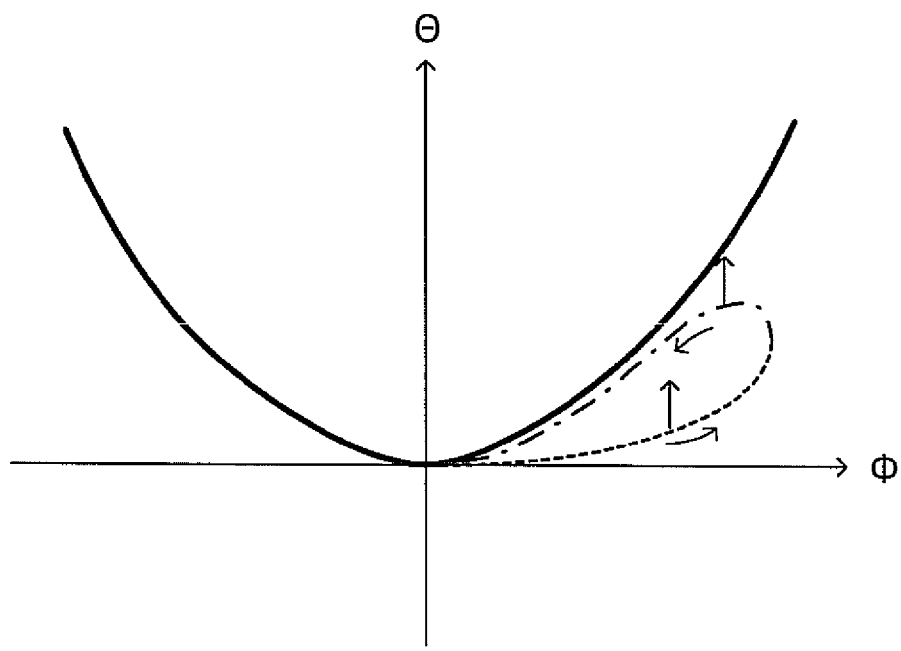
FIG. 5 is an explanatory graph showing the relation between the target characteristic and an actual characteristic.

In this case, as is apparent from FIG. 5, as the actual roll angle Φ increases, both the target pitch angle Θh in the target characteristic and the actual pitch angle Θ in the actual characteristic tend to increase; in other word, the vehicle body tends to tilt forward to a greater degree. Therefore, it is possible to change the actual pitch angle Θ to approach the target pitch angle Θh. That is, in this case, the suspension ECU 13 can control the actual pitch angle Θ to approach the target pitch angle Θh by means of, for example, decreasing the damping forces of the left and right shock absorbers 11a and 11b on the front-wheel side. Furthermore, in this case, the posture change of the vehicle body in the turning state is natural, and the driver does not feel any unnatural sensation from the posture change of the vehicle body.

Next, a state is assumed in which, as indicated by a single-dot chain line in FIG. 5, the actual characteristic at the time when the actual roll angle Φ decreases is located below the target characteristic. In this case as well, in order to secure maneuvering stability, the actual pitch angle Θ must be increased so that the actual pitch angle Θ approaches the target pitch angle Θh in the target characteristic. However, whereas the target pitch angle Θh in the target characteristic tends to monotonously decrease with the actual roll angle Φ (which means that the vehicle body tends to return to a horizontal posture from the forwardly tilted posture), the actual pitch angle Θ tends to first increase toward the target pitch angle Θh and then monotonously decrease as the actual roll angle Φ decreases (which means that the vehicle body returns to the horizontal posture after having tilted forward to a greater degree). In this case, the posture change of the vehicle body in the turning state is unnatural, and the driver feels an unnatural sensation from the posture change of the vehicle body.

Moreover, in situation where, irrespective of change in the actual roll angle Φ, the actual pitch angle Θ in the actual characteristic is always smaller than the target pitch angle Θh in the previously set target characteristic, it is possible to change the actual pitch angle Θ to approach the target pitch angle Θh when the actual roll angle Φ increases or decreases. However, in some cases, the phase difference between the actual roll angle Φ and the actual pitch angle Θ becomes large. In such a case, satisfactory maneuvering stability cannot be secured.

Figure 6:
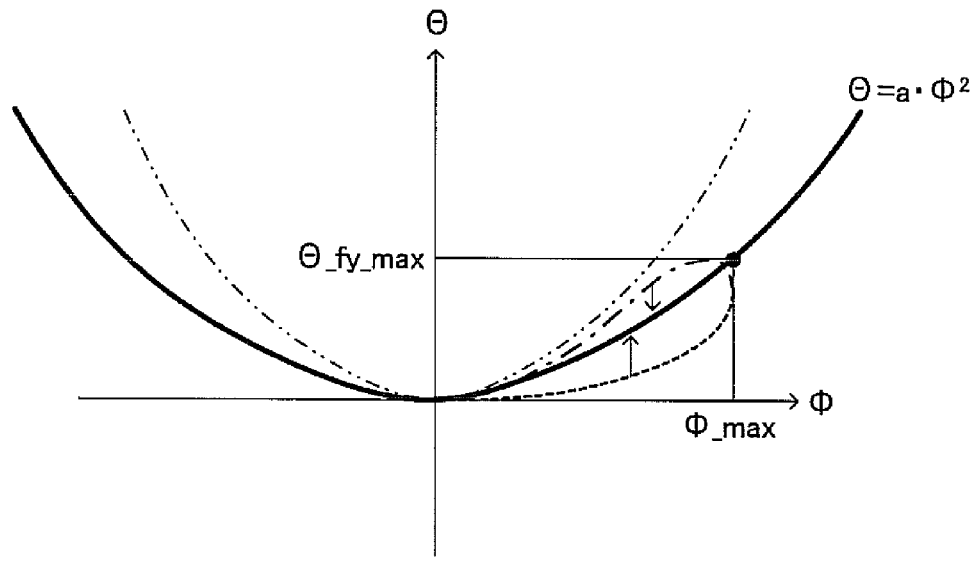
FIG. 6 is an explanatory graph showing the relation between the actual characteristic and the target characteristic which has been changed by use of a target characteristic changing coefficient.

Therefore, in consideration of the actual characteristic (the actual roll angle Φ and the actual pitch angle Θ) in the current turning state, the suspension ECU 13 calculates the target characteristic changing coefficient a_new which is used to change the target characteristic represented by a quadratic function. That is, the suspension ECU 13 calculates the target characteristic changing coefficient a_new such that, when the actual roll angle Φ increases, the actual pitch angle Θ can be increased to approach the target pitch angle Θh, and, when the actual roll angle Φ decreases, the actual pitch angle Θ can be decreased to approach the target pitch angle Θh as shown in FIG. 6.

Specifically, the suspension ECU 13 acquires the actual roll angular speed φ detected by the roll rate sensor 17 and the actual pitch angular speed θ detected by the pitch rate sensor 18. Subsequently, the suspension ECU 13 integrates the acquired actual roll angular speed φ with respect to time to thereby calculate the actual roll angle Φ, and integrates the acquired actual pitch angular speed θ with respect to time to thereby calculate the actual pitch angle Θ. The suspension ECU 13 then calculates the target characteristic changing coefficient a_new in accordance with the following Eq. 1.

$$a\_new = \Theta\_fy\_max / (\Phi\_max)^2 \quad \text{Eq. 1}$$

In Eq. 1, Θ_fy_max represents the maximum turning pitch angle, which is the maximum value of turning pitch angle Θ_fy which is generated as a result of the left and right front wheels being steered and which is a fraction of the actual pitch angle Θ in the present turning state; and Φ_max represents the maximum actual roll angle which the maximum value of the actual roll angle Φ. After completion of the calculation of the target characteristic changing coefficient a_new, the suspension ECU 13 returns to step S11. Notably, as will be described later, in the case where the suspension ECU 13 executes step S11 after the calculation of the target characteristic changing coefficient a_new, the suspension ECU 13 determines that the roll control is being executed.

When the suspension ECU 13 determines in step S11 that the roll control is currently executed (i.e., when the suspension ECU 13 makes a "Yes" determination), the suspension ECU 13 proceeds to step S14.

In step S14, the suspension ECU 13 determines whether or not the absolute value of the lateral acceleration Gl detected by the lateral acceleration sensor 14a is equal to or greater than a reference lateral acceleration Gls. In the below, this determination will be described. As described above, in the above-mentioned step S13, the suspension ECU 13 calculates the target characteristic changing coefficient a_new for changing the target characteristic in accordance with the actual characteristic such that the actual pitch angle Θ can be caused to approach the target pitch angle Θh. Thus, the changing trend of the actual pitch angle Θ for a change in the actual roll angle Φ can be made coincident (fitted) with the changing trend of the target pitch angle Θh for a change in the actual roll angle Φ.

Incidentally, according to the above-mentioned Eq. 1, the target characteristic changing coefficient a_new is calculated from the maximum value of the actual roll angle Φ and the maximum value of the actual pitch angle Θ (more specifically, the maximum turning pitch angle Θ_fy_max). In this case, in a state in which the actual roll angle Φ and the actual pitch angle Θ of the vehicle body are very small; in other words, in a state in which the roll angular speed φ and the pitch angular speed θ detected by the roll rate sensor 17 and the pitch rate sensor 18 are very small, the signal strength (so-called SN ratio) of each of the signals supplied from these sensors 17 and 18 to the suspension ECU 13 become very small in some cases. That is, in such a case, since the strength of noise contained in each signal supplied to the suspension ECU 13 is large, accurate calculation of the actual roll angle Φ and the actual pitch angle Θ becomes difficult. As a result, the target characteristic changing coefficient a_new cannot be calculated accurately in accordance with the above-mentioned Eq. 1, and the accuracy in fitting the changing trend of the actual pitch angle Θ for a change in the actual roll angle Φ with the changing trend of the target pitch angle Θh for a change in the actual roll angle Φ may drop.

In this regard, for example, it is possible to previously and experimentally set the magnitude of a determination roll angle (a determination roll angular speed), based on which determination can be made as to whether or not each signal output to the suspension ECU 13 can have a sufficiently high SN ratio, and to cause the suspension ECU 13 to determine whether or not the magnitude of the actual roll angle Φ (the detected roll angular speed φ) is greater than the magnitude of the determination roll angle (the determination roll angular speed). However, since the actual roll angle Φ (the detected roll angular speed φ) may vary even when the same vehicle turns in the same manner as described above, determining the SN ratio on the basis of the actual roll angle Φ (the detected roll angular speed φ) may be inaccurate.

Therefore, the suspension ECU 13 uses the magnitude (absolute value) of the lateral acceleration Gl as a physical quantity which causes rolling behavior of the vehicle body irrespective of change in the state of the vehicle, and compares the absolute value of the lateral acceleration Gl with a reference lateral acceleration Gls previously set for obtaining a sufficiently large SN ratio. That is, the suspension ECU 13 acquires the lateral acceleration Gl detected by the lateral acceleration sensor 14a, and compares the absolute value of the lateral acceleration Gl with the reference lateral acceleration Gls. When the absolute value of the lateral acceleration Gl is equal to or greater than the reference lateral acceleration Gls, the SN ratios of the signals output from the roll rate sensor 17 and the pitch rate sensor 18 are large. Therefore, the suspension ECU 13 makes a "Yes" determination, and proceeds to step 15. This enables the suspension ECU 13 to calculate the target characteristic changing coefficient a_new by using the maximum value of the actual roll angle Φ and the maximum value of the actual pitch angle Θ (more specifically, the maximum turning pitch angle Θ_fy_max) as more accurate values.

Meanwhile, when the absolute value of the lateral acceleration Gl is less than the reference lateral acceleration Gls, the SN ratios of the signals output from the roll rate sensor 17 and the pitch rate sensor 18 are small. Therefore, the suspension ECU 13 makes a "No" determination, and proceeds to step 20. In this case, the strength of noise is large, and the maximum value of the actual roll angle Φ and the maximum value of the actual pitch angle Θ (more specifically, the maximum turning pitch angle Θ_fy_max) cannot be used as accurate values. Therefore, the suspension ECU 13 does not change the presently set target characteristic changing coefficient a, as will be described later; that is, does not change the target characteristic.

In step S15, the suspension ECU 13 determines whether or not a roll is generated in the vehicle body, which is the sprung portion, due to a driver's steering operation of the steering wheel. That is, the suspension ECU 13 determines that a roll is generated in the vehicle body due to the steering operation when one of the following determination conditions A) and B) is satisfied.

Determination condition A): the difference (absolute value) between the actual roll angle Φ and an estimated roll angle Φe generated as a result of the steering operation is less than a reference roll angle difference Φs.

Determination condition B): the absolute value of an intermediate frequency component (e.g., in the vicinity of a roll resonance frequency) of the input signal of the vertical acceleration Gv of the vehicle body is less than a reference vertical acceleration Gvs.

Specifically, in order to calculate the estimated roll angle Φe generated as a result of the steering operation, on the basis of the steering angle δ of the steering wheel detected by the steering angle sensor 16, the suspension ECU 13 first calculates a lateral acceleration Gle, which is generated as a result of the steering operation, in accordance with the following Eq. 2.

$$Gle=(1/1+A \cdot V^2)) \cdot (V^2(\delta/(n \cdot L))) \quad \text{Eq. 2}$$

In Eq. 2, A represents a stability factor, V represents the vehicle speed V detected by the vehicle speed sensor 15, n represents a steering gear ratio, and L represents a wheelbase of the vehicle.

Next, through use of the lateral acceleration Gle calculated in accordance with the above-mentioned Eq. 2, the suspension ECU 13 calculates a transfer function of the estimated roll angle Φe shown in the following Eq. 4, which is derived from the equation of motion of the flowing Eq. 3, which represents a roll (rolling motion) generated in the vehicle body.

$$I \cdot d^2\Phi/dt^2 + C \cdot d\Phi/dt + R \cdot \Phi = M \cdot h \cdot Gle + M \cdot g \cdot h \cdot \Phi \quad \text{Eq. 3}$$

$$\Phi(s)/Gle(s)=(M \cdot h)/(I \cdot s^2 + C \cdot s + R - M \cdot g \cdot h) \quad \text{Eq. 4}$$

In Eqs. 3 and 4, Φ represents the roll angle of the vehicle body, I represents an inertia moment of the sprung portion (the vehicle body), C represents a damping coefficient, R represents a stiffness against rolling, M represents the mass of the sprung portion (the vehicle body), h represents the distance between the roll center and the center of gravity of the sprung portion (the vehicle body), and g represent the acceleration of gravity. In Eq. 4, s represents a Laplacian operator. The suspension ECU 13 calculates the estimated roll angle Φe on the basis of the transfer function of Eq. 4, and calculates the actual roll angle Φ by integrating, with time, the roll angular speed φ detected by the roll rate sensor 17. The suspension ECU 13 then determines whether or not the difference (absolute value) between the estimated roll angle Φe and the actual roll angle Φ is less than the reference roll angle difference Φs.

Furthermore, the suspension ECU 13 acquires the vertical acceleration Gv detected by the vertical acceleration sensor 14c, and determines whether or not the absolute value of the intermediate frequency component of the input signal which represents the acquired vertical acceleration Gv is less than the reference vertical acceleration Gvs.

That is, in the case where the suspension ECU 13 determines in step S15 that both the determination condition A) and the determination condition B) are satisfied, rolling behavior (rolling motion) of the vehicle body occurs due to the steering operation of the steering wheel. Therefore, the suspension ECU 13 makes a "Yes" determination, and proceeds to step S16. Meanwhile, in the case where only one of the determination condition A) and the determination condition B) is satisfied or none of the determination condition A) and the determination condition B) are satisfied, the rolling behavior (rolling motion) of the vehicle body occurs due to not only the steering operation of the steering wheel, but also an input from a road surface. Therefore, the suspension ECU 13 makes a "No" determination, and proceeds to step S20. That is, in this case, the suspension ECU 13 does not change the presently set target characteristic changing coefficient a, as will be described later; that is, does not change the target characteristic.

In step S16, the suspension ECU 13 determines a brake-drive pitch angle Θ_fx; i.e., a pitch angle of the vehicle body which is generated when the driver brakes or drives (hereinafter referred to as "brakes/drives") the vehicle in a turning state. Specifically, when the driver perform a braking operation or an accelerating operation so as to brake/drive the vehicle in a turning state, a longitudinal acceleration Gc is generated, and the actual pitch angle Θ generally increases or decreases due to the influence of the longitudinal acceleration Gc. That is, in this case, the actual pitch angle Θ is the sum of the turning pitch angle Θ_fy generated as a result of the left and right front wheels being steered, and the brake-drive pitch angle Θ_fx generated as a result of the vehicle being braked/driven.

Figure 7:
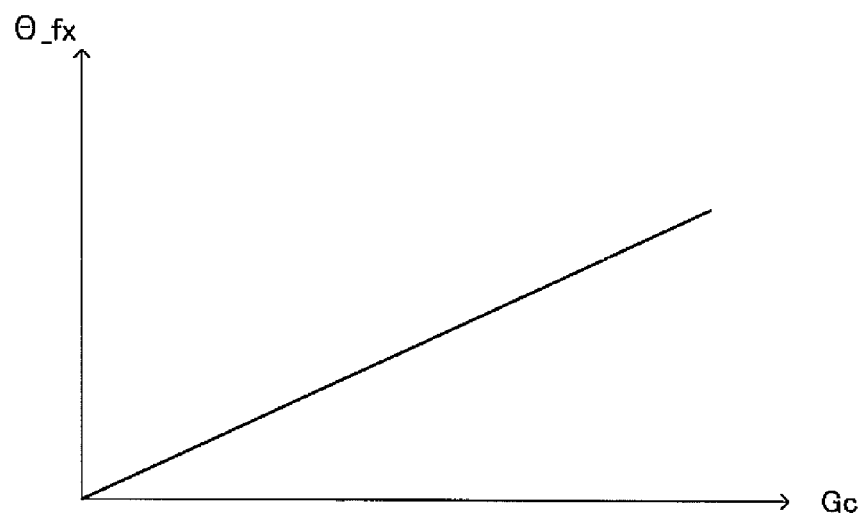
FIG. 7 is a graph showing the relation between longitudinal acceleration and brake-drive pitch angle.

Therefore, the suspension ECU 13 determines the brake-drive pitch angle Θ_fx with reference to a map shown in FIG. 7 and representing the relation between the longitudinal acceleration Gc and the brake-drive pitch angle Θ_fx, which is experimentally determined in advance. That is, the suspension ECU 13 acquires the longitudinal acceleration Gc detected by the longitudinal acceleration sensor 14b, determines the brake-drive pitch angle Θ_fx corresponding to the acquired longitudinal acceleration Gc, and proceeds to step S17.

In step S17, the suspension ECU 13 calculates the turning pitch angle Θ_fy, which is a fraction of the actual pitch angle Θ currently generated in the vehicle body. As described above, when the driver brakes/drives the vehicle in a turning state, the brake-drive pitch angle Θ_fx is additionally generated, whereby the actual pitch angle Θ changes. Notably, the brake-drive pitch angle Θ_fx is generated only when the vehicle is braked/driven. Therefore, for example, in the case where the target characteristic changing coefficient a_new is calculated in accordance with the above-described Eq. 1 and by use of the actual pitch angle Θ which contains the brake-drive pitch angle Θ_fx, the value of the target characteristic changing coefficient a_new changes depending on whether or not the vehicle is braked/driven. That is, in the case where the target characteristic changing coefficient a_new is calculated in consideration of the brake-drive pitch angle Θ_fx, deterioration may occur in the accuracy in equalizing (fitting) the changing trend of the actual pitch angle Θ for a change in the actual roll angle Φ with the changing trend of the target pitch angle Θh for a change in the actual roll angle Φ. In view of this fact, as described above, in the above-mentioned Eq. 1, the target characteristic changing coefficient a_new is calculated through use of only the turning pitch angle Θ_fy generated as a result of the left and right front wheels being steered (more specifically, the maximum turning pitch angle Θ_fy_max).

Therefore, in order to accurately calculate the target characteristic changing coefficient a_new in accordance with the above-mentioned Eq. 1, in step S17, the suspension ECU 13 calculates the turning pitch angle Θ_fy by subtracting the brake-drive pitch angle Θ_fx from the actual pitch angle Θ. That is, the suspension ECU 13 calculates the turning pitch angle Θ_fy in accordance with the following Eq. 5.

$$\Theta\_fy = \Theta - \Theta\_fx \qquad \text{Eq. 5}$$

After completion of the calculation of the turning pitch angle Θ_fy, the suspension ECU 13 proceeds to step S18.

In step S18, the suspension ECU 13 holds (latches) a maximum actual roll angle Φ_max, which is the maximum value of the actual roll angle Φ in the current turning state, and a maximum turning pitch angle Θ_fy_max, which is the maximum value of the turning pitch angle Θ_fy calculated in the above-described step S17. That is, the suspension ECU 13 successively stores, for example, in a predetermined storage area within the RAM, the actual roll angle Φ and the turning pitch angle Θ_fy, which vary every moment in a turning state, latches the respective maximum vales among the successively stored values of the actual roll angle Φ and the turning pitch angle Θ_fy, and stores them as the maximum actual roll angle Φ_max and the maximum turning pitch angle Φ_fy_max, respectively. Subsequently, in the above-mentioned step S13, which is executed in the next and subsequent program execution cycles, the suspension ECU 13 calculates the target characteristic changing coefficient a_new such that a curve representing the target characteristic passes though a point determined by the latched maximum actual roll angle Φ_max and maximum turning pitch angle Θ_fy_max as shown in FIG. 6; that is, the suspension ECU 13 calculates target characteristic changing coefficient a_new in accordance with the above-mentioned Eq. 1. After completion of the latching and storing the maximum actual roll angle Φ_max and the maximum turning pitch angle Θ_fy_max, the suspension ECU 13 proceeds to step S19.

In step S19, the suspension ECU 13 changes the set value of the change permission flag FRG_A from "0" (which represents prohibition of change) to "1" (which represents permission of change). That is, the situation in which the above-mentioned step S19 is executed is a situation in which the vehicle is presently in a turning state, the roll control is being executed (a "Yes" determination is made in step S11), and determination conditions in step S14 and step S15 are satisfied and a "Yes" determination is made in these steps. Moreover, the present situation is a situation where, as a result of the "Yes" determinations in these steps S14 and S15, steps S16 to S18 are executed so as to latch and store the maximum actual roll angle Θ_max and the maximum turning pitch angle Θ_fy_max.

In other words, in the present situation, the suspension ECU 13 can move from a state in which the suspension ECU 13 properly controls the damping forces of the shock absorbers 11a, 11b, 11c, and 11d in accordance with the target characteristic changed by use of the target characteristic changing coefficient a calculated through execution of the roll control program up to the last time, to a state in which the suspension ECU 13 controls the damping forces of the shock absorbers 11a, 11b, 11c, and 11d in accordance with a new target characteristic changed by use of the target characteristic changing coefficient a_new newly calculated in the above-described step S13. Accordingly, the suspension ECU 13 changes the set value of the change permission flag FRG_A from "0" to "1" in order to change the target characteristic, and then proceeds to step S20.

In the case where the determination processing of the above-described step S14 or step S15 determines that the determination condition is not satisfied and makes a "No" determination, in step S20, the suspension ECU 13 maintains the target characteristic changing coefficient a, which has been set to the target characteristic changing coefficient a_new calculated in the above-described step S13 through execution of the roll control program up to the last time. Meanwhile, in the case where the set value of the change permission flag FRG_A is changed from "0" to "1" in the above-described step S19, the suspension ECU 13 changes the target characteristic changing coefficient a to the newly calculated target characteristic changing coefficient a_new through execution of step S20 in the next and subsequent program execution cycles. Notably, in the case where, after the ignition switch is turned on, a "No" determination is made in the determination processing of the above-described step S14 or step S15 and the processing of step S20 is first performed, the suspension ECU 13 sets the target characteristic changing coefficient a to an initial value stored, for example, in the ROM in advance.

When the suspension ECU 13 changes the target characteristic changing coefficient a to the target characteristic changing coefficient a_new, the suspension ECU 13 properly changes the updating frequency (learning property) of the target characteristic changing coefficient a in accordance with changes in posture state quantities (the actual roll angle Φ and the actual pitch angle Θ) of the vehicle. Specifically, the suspension ECU 13 increases the calculation frequency of the target characteristic changing coefficient a_new to thereby increase the updating frequency of the target characteristic changing coefficient a (in other words, increase the speed of learning) when a large change in the posture state quantities of the vehicle is expected; specifically, when one of the following conditions a) to c) is satisfied.

Condition a): the present point in time is between a point in time when the ignition switch is turned on and a point in time when a predetermined time elapses after that point in time.

Condition b): the present point in time is between a point in time when the trunk lid is opened and closed and a point in time when the target characteristic changing coefficient a is first updated after that point in time.

Condition c): the present point in time is between a point in time when a door is opened and closed and a point in time when the target characteristic changing coefficient a is first updated after that point in time.

Specifically, when at least one of the conditions a) to c) is satisfied, the posture state quantities of the vehicle become highly likely to change. Therefore, the suspension ECU 13 increases the updating frequency of the target characteristic changing coefficient a by increasing the change permission width (rate limiter) of the target characteristic changing coefficient a, or decreases the time constant of a low pass filter (LPF) associated with update of the target characteristic changing coefficient a. By virtue of this, it becomes possible to increase the updating frequency (learning speed) of the target characteristic changing coefficient a; i.e., increase the frequency at which the target characteristic changing coefficient a is changed to the target characteristic changing coefficient a_new.

Meanwhile, the suspension ECU 13 decreases the calculation frequency of the target characteristic changing coefficient a_new to thereby decease the speed of learning of the target characteristic changing coefficient a when a change in the posture state quantities of the vehicle is not expected; specifically, when all the following conditions d) to f) are satisfied.

Condition d): the predetermined time has elapsed after the ignition switch was turned on.

Condition e): the target characteristic changing coefficient a has been updated after the trunk lid was opened and closed.

Condition f): the target characteristic changing coefficient a has been updated after the door was opened and closed.

That is, when all the conditions d) to f) are satisfied, changes in the posture state quantities of the vehicle are small, and update (learning) of the target characteristic changing coefficient a has already been performed to some degree. Therefore, the suspension ECU 13 decreases the updating frequency of the target characteristic changing coefficient a by decreasing the change permission width (rate limiter) of the target characteristic changing coefficient a, or increases the time constant of the low pass filter (LPF) associated with update of the target characteristic changing coefficient a. By virtue of this, it becomes possible to decrease the updating frequency (learning speed) of the target characteristic changing coefficient a; i.e., decrease the frequency at which the target characteristic changing coefficient a is changed to the target characteristic changing coefficient a_new.

By means of properly changing the updating frequency (learning property) of the target characteristic changing coefficient a in accordance with changes in the posture state quantities of the vehicle as described above, robustness associated with update of the target characteristic changing coefficient a can be secured satisfactorily. After having changed the target characteristic changing coefficient a to the target characteristic changing coefficient a_new in step S20, the suspension ECU 13 returns the set value of the change permission flag FRG_A from "1" to "0," and proceeds to step S21.

In step S21, the suspension ECU 13 executes a damping force control routine which controls the damping forces of the shock absorbers 11a, 11b, 11c, and 11d on the basis of the target characteristic properly changed by the target characteristic changing coefficient a set in the above-described step S20. Next, this damping force control routine will be described.

Figure 8:
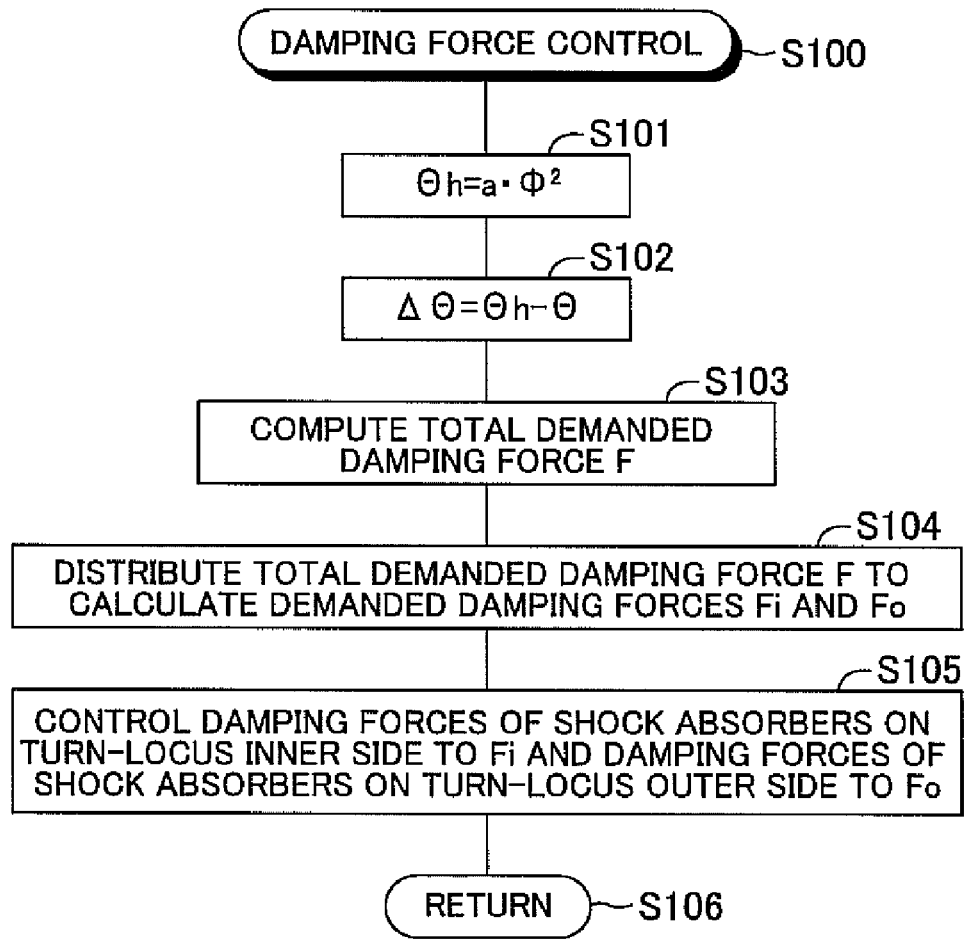
FIG. 8 is a flowchart of a damping force control routine executed by the suspension ECU of FIG. 1.

The suspension ECU 13 starts the execution of the damping force control routine shown in FIG. 8 in step S100. In step S101 subsequent thereto, the suspension ECU 13 calculates the target pitch angle Θh on the basis of the target characteristic represented by the following Eq. 6, in which the target characteristic changing coefficient a (the target characteristic changing coefficient a_new) set in the above-described step S20 is used.

$$\Theta h = a \cdot \Phi^2 \qquad \text{Eq. 6}$$

In Eq. 6, Φ represents the actual roll angle Φ calculated through integration, with time, of the roll angular speed φ detected by the roll rate sensor 17. After having calculated the target pitch angle Θh, the suspension ECU 13 proceeds to step S102.

In step S102, the suspension ECU 13 calculates the difference ΔΘ between the actual pitch angle Θ and the target pitch angle Θh calculated in the above-described step S101 in accordance with the following Eq. 7.

$$\Delta\Theta = \Theta h - \Theta \qquad \text{Eq. 7}$$

In Eq. 7, Θ represents the actual pitch angle calculated through integration, with time, of the pitch angular speed Θ detected by the pitch rate sensor 18. After having calculated the difference ΔΘ, the suspension ECU 13 proceeds to step S103.

In step S103, the suspension ECU 13 calculates a total demanded damping force F, which is a total damping force which must be produced by the front-wheel-side left and right shock absorbers 11a and 11b the rear-wheel-side left and right shock absorbers 11c and 11d in order to reduce the difference ΔΘ calculated in the above-described step S102 to "0." In the below, calculation of this total demanded damping force F will be described. However, since various known methods can be employed for this calculation, detailed description of the calculation will not be provided, and an exemplary method for the calculation will be described briefly.

The total demanded damping force F required to change the actual pitch angle Θ of the vehicle body to the target pitch angle Θh can be calculated by use of a pitch moment Pm. The pitch moment Pm can be calculated in accordance with the following Eq. 8.

$$Pm = I \cdot (\Delta\Theta)'' + C \cdot (\Delta\Theta)' + K \cdot (\Delta\Theta) \qquad \text{Eq. 8}$$

In Eq. 8, I represents an inertia moment, C represents a damping coefficient, and K represents a spring constant. Further, in Eq. 8, ΔΘ represents the difference calculated in the above-mentioned step S102, (ΔΘ)" represents the second derivative value of the difference ΔΘ, and (ΔΘ)' represents the first derivative value of the difference ΔΘ.

The total demanded damping force F can be calculated by dividing the pitch moment Pm in the longitudinal direction of the vehicle body represented by Eq. 8, by the wheelbase L of the vehicle. That is, the total demanded damping force F can be calculated in accordance with the following Eq. 9.

$$F = Pm/L \qquad \text{Eq. 9}$$

Upon completion of the calculation of the total demanded damping force F, the suspension ECU 13 proceeds to step S104.

In step S104, the suspension ECU 13 executes a distribution computation for distributing the total demanded damping force F calculated in the above-described step S103 between the front-wheel-side left and right shock absorbers 11a and 11b and between the rear-wheel-side left and right shock absorbers 11c and 11d. Notably, since similar calculation is performed for both the front wheel side and the rear wheel side, in the following description, the description will be provided for the front-wheel-side left and right shock absorbers 11a and 11b only and provided for the case where the vehicle makes a leftward turn.

For distribution of the total demanded damping force F to the left and right shock absorbers 11a and 11b, the suspension ECU 13 uses a distribution amount X which is proportional to the magnitude of the lateral acceleration Gl generated in the vehicle in a turning state. Specifically, when assuming a state where the total demanded damping force F is required to be distributed to the front wheel side of the vehicle, first, the total demanded damping force F is equally distributed to the shock absorbers 11a and 11b.

Subsequently, the suspension ECU 13 adds the distribution amount X to the demanded damping force (F/2) equally distributed to each of the shock absorbers 11a and 11b. At this time, on the basis of the direction (in this case, leftward direction) of the lateral acceleration Gl acquired from the lateral acceleration sensor 14*a*, the suspension ECU 13 adds the distribution amount X of the positive to the demanded damping force (F/2) of the shock absorber 11*a* on the turn-locus inner side, and adds the distribution amount X of the negative to the demanded damping force (F/2) of the shock absorber 11*b* on the turn-locus outer side.

That is, a damping force Fi demanded for the shock absorber 11*a* on the turn-locus inner side, and a damping force Fo demanded for the shock absorber 11*b* on the turn-locus outer side are represented by the following Eqs. 10 and 11.

$$Fi=(F/2)+X \qquad \text{Eq. 10}$$

$$Fo=(F/2)-X \qquad \text{Eq. 11}$$

Since the distribution amount X is proportional to the magnitude of the lateral acceleration Gl, it can be represented by the following Eq. 12.

$$X=\alpha \cdot (F/2) \qquad \text{Eq. 12}$$

In Eq. 12, α represents a variable which changes in proportion to the magnitude of the lateral acceleration Gl and is represented by the following Eq. 13.

$$\alpha=(1+|Gl|\cdot J) \qquad \text{Eq. 13}$$

In Eq. 13, J is a positive variable which may change in accordance with a mode selected by the driver for the roll control performed by the suspension ECU 13; for example, a mode selected from a control mode for giving priority to ride quality and a control mode for giving priority to sporty driving.

Incidentally, on the basis of the above-mentioned Eqs. 10 to 13, there stands a relation in which the damping force Fi demanded for the shock absorber 11*a* on the turn-locus inner side always assumes a positive value, and the damping force Fo demanded for the shock absorber 11*b* on the turn-locus outer side always assumes a negative value. Further, when the damping force Fi demanded for the shock absorber 11*a* on the turn-locus inner side and the damping force Fo demanded for the shock absorber 11*b* on the turn-locus outer side are added together, the result becomes equal to the total demanded damping force F demanded for the front wheel side. By means of distributing the total demanded damping force F to the turn-locus inner side and the turn-locus outer side as described above, it becomes possible to generate a proper actual roll angle Φ in the vehicle body, and to reliably change the actual pitch angle Θ to the target pitch angle Θh.

After having distributed the demanded damping force Fi to the shock absorber 11*a* (the shock absorber 11*c*) corresponding to the turning-locus inner side of the vehicle and the demanded damping force Fo to the shock absorber 11*b* (the shock absorber 11*d*) corresponding to the turning-locus outer side of the vehicle, the suspension ECU 13 proceeds to step S105.

In step S105, the suspension ECU 13 drives and controls the drive circuits 19*a*, 19*b*, 19*c*, and 19*d* such that the shock absorbers 11*a* and 11*c* on the turn-locus inner side generate the demanded damping force Fi determined in the above-described step S104, and such that the shock absorbers 11*b* and 11*d* on the turn-locus outer side generate the demanded damping force Fo determined in the above-described step S104. This causes the rotary valves 12*a*, 12*b*, 12*c*, and 12*d* of the shock absorbers 11*a*, 11*b*, 11*c*, and 11*d* to change the diameters of the corresponding flow paths for the working fluid. Accordingly, the damping force generated by each of the shock absorbers 11*a*, 11*b*, 11*c*, and 11*d* coincides with the demanded damping force Fi or the demanded damping force Fo in accordance with the turning direction of the vehicle.

After having properly changing the damping forces of the shock absorbers 11*a*, 11*b*, 11*c*, and 11*d*, the suspension ECU 13 proceeds to step S106 so as to end the execution of the damping force control routine and return to the roll control program. Subsequently, the suspension ECU 13 again executes step S11 and subsequent steps of the roll control program.

When the suspension ECU 13 performs the determination processing of step S11 after execution of the above-described damping force control routine, the suspension ECU 13 performs the determination processing as follows. In the case where the suspension ECU 13 made a "No" determination in the above-described step S14 or step S15; in other words, the suspension ECU 13 did not change the set value of the change permission flag FRG_A in the above-described step S19, the currently set target characteristic changing coefficient a is not required to change. Therefore, the suspension ECU 13 determines that the roll control is being executed. That is, in this case, the suspension ECU 13 makes a "Yes" determination in step S11, and executes step S14 and subsequent steps.

Meanwhile, in the case where the suspension ECU 13 made a "Yes" determination in the above-described step S14 or step S15; in other words, the suspension ECU 13 changed the set value of the change permission flag FRG_A to "1" in the above-described step S19, it is necessary to newly calculate the target characteristic changing coefficient a_new and change the currently set target characteristic changing coefficient a. Therefore, the suspension ECU 13 temporarily stops the execution of the roll control, while maintaining the damping forces of the shock absorbers 11*a*, 11*b*, 11*c*, and 11*d* set through the execution of the damping force control routine. As a result, the suspension ECU 13 makes a "No" determination in step S11, and proceeds to step S12. In step S12, the suspension ECU 13 makes a "Yes" determination because of the changing processing of the above-described step S19, and proceeds to step S13 so as to calculate the target characteristic changing coefficient a_new. Subsequently, in the next program execution cycle, the suspension ECU 13 resumes the execution of the roll control and makes a "Yes" determination in step S11, and executes step S14 and subsequent steps.

As can be understood from the above-described embodiment, according to the present embodiment, the suspension ECU 13 can calculate the target characteristic changing coefficient a_new in accordance with the above-described Eq. 1 in the above-described step S13 by changing the set value of the change permission flag FRG_A from "0" to "1" in the above-described step S19, and can change the target characteristic by setting the target characteristic changing coefficient a to the target characteristic changing coefficient a_new in step S20. With this operation, in a situation where the actual roll angle Φ increases, the target characteristic can be set such that the target pitch angle Θh becomes greater than the actual pitch angle Θ. Accordingly, the damping force Fi of the shock absorbers on the turning-locus inner side and the damping force Fo of the shock absorbers on the turning-locus outer side can be changed to decrease relatively such that the actual pitch angle Θ changes in agreement with the changing trend of the target pitch angle Θh which increases with the actual roll angle Φ; in other words, the actual pitch angle Θ increases toward the target pitch angle Θh as the actual roll angle Φ increases.

Meanwhile, in a situation where the actual roll angle Φ decreases, the target characteristic can be set such that the target pitch angle Θh becomes smaller than the actual pitch angle Θ. Accordingly, the damping force Fi of the shock absorbers on the turning-locus inner side and the damping force Fo of the shock absorbers on the turning-locus outer side can be changed to increase relatively such that the actual pitch angle $\Theta$ changes in agreement with the changing trend of the target pitch angle $\Theta h$ which decreases with the actual roll angle $\Phi$; in other words, the actual pitch angle $\Theta$ decreases toward the target pitch angle $\Theta h$ as the actual roll angle $\Phi$ decreases.

With this operation, the damping forces Fi and Fo of the shock absorbers 11a, 11b, 11c, and 11d can be controlled by means of realistic changing control, and the actual pitch angle $\Theta$ can be changed toward the target pitch angle $\Theta h$ without fail. Furthermore, since the actual pitch angle $\Theta$ can be changed in agreement with the changing trend of the target pitch angle $\Theta h$ for a change in the actual roll angle $\Phi$, the phase difference between the generation timings of a roll and a pitch can be reduced, and satisfactory maneuvering stability can be secured when the vehicle turns.

Furthermore, the suspension ECU 13 can use the maximum turning pitch angle $\Theta\_fy\_max$ in order to calculate the target characteristic changing coefficient a_new in accordance with the above-described Eq. 1. This enables the target characteristic changing coefficient a_new to be calculated such that the actual characteristic of the vehicle in the current turning state is quite accurately reflected on the target characteristic changing coefficient a_new, and, it is possible to reliably prevent the posture change from being affected by, for example, the brake-drive pitch angle $\Theta\_fx$ generated as a result of braking/driving in a turning state. Moreover, since the target characteristic changing coefficient a_new can be calculated such that the actual characteristic in the turning state is quite accurately reflected on the target characteristic changing coefficient a_new, a more proper target characteristic can be set by means of repeatedly learning (updating) the target characteristic changing coefficient a_new.

Furthermore, through execution of the determination processing of the above-described step S14, the determination as to whether to calculate the target characteristic changing coefficient a_new can be made more properly. That is, when the detected lateral acceleration Gl is equal to or greater than the reference lateral acceleration Gls, the suspension ECU 13 can change the set value of the change permission flag FRG_A from "0" to "1" in the above-described step S19, and calculate the target characteristic changing coefficient a_new in step S13. This operation prevents inaccurate calculation of the target characteristic changing coefficient a_new.

Furthermore, in the case where one or both of the above-described determination conditions A) and B) are not satisfied in the above-described step S15, an useless rolling behavior is highly likely to occur due to, for example, a vertical input from the road surface. Therefore, the suspension ECU 13 does not execute the above-described step S19 so as not to calculate the target characteristic changing coefficient a_new in step S13. With this operation, it becomes possible to properly eliminate the influence of the useless rolling behavior, and calculate the target characteristic changing coefficient a_new for the case where the rolling behavior occurs as a result of turning of the vehicle. Accordingly, a more proper target characteristic can be set by means of repeatedly learning (updating) the target characteristic changing coefficient.

Furthermore, in the case where the above-described conditions a) to c) are satisfied in the above-described step S20; i.e., in a situation where the actual characteristic represented by the actual roll angle $\Phi$ and the actual pitch angle $\Theta$ is likely to change, the updating (changing) frequency of the target characteristic changing coefficient a_new; that is, the updating (changing) frequency of the target characteristic, can be increased. With this operation, even when the actual characteristic changes, the target characteristic corresponding to the changed actual characteristic (the actual roll angle $\Phi$ and the actual pitch angle $\Theta$) can be updated (changed) repeatedly, whereby the target characteristic can be changed such that the changed actual characteristic is well reflected on the target characteristic. Furthermore, robustness can be enhanced by increasing the updating (changing) frequency of the target characteristic and repeatedly learning (updating) the target characteristic changing coefficient a_new, whereby a more proper target characteristic can be set.

The present invention is not limited to the above-described embodiment, and the embodiment may be modified in various ways without departing from the scope of the present invention.

For example, in the roll control program of the above-described embodiment, the suspension ECU 13 executes step S16 to step S19 when it makes a "Yes" determination in step S14 because of satisfaction of the determination condition thereof, and a "Yes" determination in step S15 because of satisfaction of the determination condition A) and the determination condition B). However, the roll control program may be modified such that the suspension ECU 13 executes only one of the determination processings of step S14 and step S15, and executes step S16 to step S19 when the corresponding determination condition is satisfied. In this case as well, effects similar to those of the above-described embodiment can be expected.

Furthermore, in the case where the suspension ECU 13 executes the determination processing of step S14 only, the determination processing of step S14 may be modified such that the reference lateral acceleration Gls is set to a smaller value upon satisfaction of at least one of the above-described condition a) (the present point in time is between a point in time when the ignition switch is turned on and a point in time when a predetermined time elapses after that point in time), condition b) (the present point in time is between a point in time when the trunk lid is opened and closed and a point in time when the target characteristic changing coefficient a is first updated after that point in time), and condition c) (the present point in time is between a point in time when a door is opened and closed and a point in time when the target characteristic changing coefficient a is first updated after that point in time). With this modification, the frequency at which the suspension ECU 13 makes a "Yes" determination in step S14 increases, and the frequency at which the value of the change permission flag FRG_A is changed in step S19 increases, whereby the calculation frequency of the target characteristic changing coefficient a_new in step S13 can be increased. Therefore, this modification is expected to increase the frequency of changing of the target characteristic changing coefficient a in step S20; in other word, the frequency of changing of the target characteristic.

Furthermore, in the case where the suspension ECU 13 executes the determination processing of step S15 only, the determination processing of step S15 may be modified such that both the reference roll angle $\Phi s$ and the reference vertical acceleration Gvs are set to larger values upon satisfaction of at least one of the above-described conditions a) to c). With this modification, the frequency at which the suspension ECU 13 makes a "Yes" determination in step S15 increases, and the frequency at which the value of the change permission flag FRG_A is changed in step S19 increases, whereby the calculation frequency of the target characteristic changing coefficient a_new in step S13 can be increased. Therefore, this modification is expected to increase the frequency of changing of the target characteristic changing coefficient a in step S20; in other word, the frequency of changing of the target characteristic.

Furthermore, in the above-described embodiment, through execution of the damping force control routine, the suspension ECU 13 controls the damping forces while determining the demanded damping forces Fi and Fo of the shock absorbers 11a, 11b, 11c, and 11d in accordance with the lateral acceleration Gl detected by the lateral acceleration sensor 14a, which serves as a physical quantity detection means. However, it is possible to execute the determination processing of the above-described step S14 and the damping force control routine on the basis of the magnitude of a yaw rate generated in the vehicle. In this case, there is provided a yaw rate sensor which detects the generated yaw rate and outputs the detected yaw rate to the suspension ECU 13.

Even in the case where a yaw rate generated in the vehicle is utilized as described above, in the roll control program, the suspension ECU 13 can determine in step S14 whether or not the SN ratio of a signal output from the yaw rate sensor is large, whereby the target characteristic changing coefficient a_new can be calculated more accurately; in other words, satisfactory fitting accuracy can be secured. Moreover, in the damping force control routine, the suspension ECU 13 can calculate the distribution amount X by use of a variable $\alpha$ which changes in proportion to the absolute value of the yaw rate. The suspension ECU 13 then calculates the demanded damping force Fi of the shock absorbers corresponding to the turning-locus inner side and the demanded damping force Fo of the shock absorbers corresponding to the turning-locus outer side. Thus, effects similar to those of the above-described embodiment can be attained.

Furthermore, it is possible to execute the determination processing of the above-described step S14 and the damping force control routine on the basis of the magnitude of the steering angle $\delta$ detected by the steering angle sensor 16. Even in the case where the steering angle $\delta$ generated as a result of operation of the steering wheel is utilized as described above, in the roll control program, the suspension ECU 13 can determine in step S14 whether or not the SN ratio of the signal output from the steering angle sensor 16 is large, whereby the target characteristic changing coefficient a_new can be calculated more accurately; in other words, satisfactory fitting accuracy can be secured. Moreover, in the damping force control routine, the suspension ECU 13 can calculate the distribution amount X by use of a variable $\alpha$ which changes in proportion to the absolute value of the steering angle $\delta$. The suspension ECU 13 then calculates the demanded damping force Fi of the shock absorbers corresponding to the turning-locus inner side and the demanded damping force Fo of the shock absorbers corresponding to the turning-locus outer side. Thus, effects similar to those of the above-described embodiment can be attained.

Moreover, in the above-described embodiment, the roll rate sensor 17 detects the roll angular speed $\Phi$, the pitch rate sensor 18 detects the pitch angular speed $\theta$, and the suspension ECU 13 calculates the actual roll angle $\Phi$ and the actual pitch angle $\Theta$ by integrating the detected roll angular speed $\phi$ and the detected pitch angular speed $\theta$ with respect to time. Needless to say, the embodiment may be modified to use sensors which directly detect the roll angle and the pitch angle generated in the vehicle body.

The invention claimed is:

1. A vehicular damping force control device which changes and controls damping forces of shock absorbers disposed between a vehicle body and wheels, characterized by comprising:

physical quantity detection device that detects a predetermined physical quantity which changes with turning of the vehicle body;

posture-state-quantity detection device that detects an actual roll angle generated in a lateral direction of the vehicle body and an actual pitch angle generated in a longitudinal direction of the vehicle body;

target-characteristic-changing-coefficient calculation device that calculates a target characteristic changing coefficient for changing a target characteristic in accordance with an actual characteristic of the vehicle body represented by the actual roll angle and the actual pitch angle detected by the posture-state-quantity detection device, the target characteristic representing a relation between roll angle and pitch angle for controlling rolling behavior of the vehicle body and determined such that the pitch angle changes quadratically with the roll angle;

target characteristic changing device that changes the target characteristic by use of the target characteristic changing coefficient calculated by the target-characteristic-changing-coefficient calculation device;

total-damping-force calculation device that calculates, on a basis of the target characteristic changed by the target characteristic changing device, a total damping force which must be cooperatively generated by left and right shock absorbers disposed on a front-wheel side of the vehicle and left and right shock absorbers disposed on a rear-wheel side of the vehicle;

total-damping-force distribution device that distributes the total damping force calculated by the total-damping-force calculation device to the shock absorbers disposed on a turn-locus inner side and the shock absorbers disposed on a turn-locus outer side in accordance with the predetermined physical quantity detected by the physical quantity detection device; and damping force control device that changes and controls the damping forces of the shock absorbers on a basis of the damping forces distributed by the total-damping-force distribution device to the shock absorbers disposed on the turn-locus inner side and the shock absorbers disposed on the turn-locus outer side.

2. The vehicular damping force control device according to claim 1, wherein the target-characteristic-changing-coefficient calculation device calculates the target characteristic changing coefficient by use of a maximum actual roll angle and a maximum actual pitch angle detected by the posture-state-quantity detection device during current turning of the vehicle.

3. The vehicular damping force control device according to claim 2, further comprising:

longitudinal acceleration detection device that detects acceleration in the longitudinal direction generated in the vehicle body;

brake-drive-pitch-angle determination device that determines, from the acceleration in the longitudinal direction of the vehicle body detected by the longitudinal acceleration detection device, a brake-drive pitch angle in the longitudinal direction of the vehicle body which has a predetermined relation with the acceleration in the longitudinal direction generated in the vehicle body, which is a fraction of the actual pitch angle generated in the vehicle body, and which is generated as a result of the vehicle body being braked or driven;

turning-pitch-angle calculation device that calculates a turning pitch angle in the longitudinal direction of the vehicle body by subtracting the brake-drive pitch angle determined by the brake-drive-pitch-angle determination device from the actual pitch angle detected by the posture-state-quantity detection device, the turning pitch angle being generated as a result of turning of the vehicle body and being a fraction of the actual pitch angle generated in the vehicle body, wherein the target-characteristic-changing-coefficient calculation device calculates the target characteristic changing coefficient by use of the maximum turning pitch angle calculated by the turning-pitch-angle calculation device during the current turning of the vehicle body.

4. The vehicular damping force control device according to claim 1, wherein the target-characteristic-changing-coefficient calculation device calculates the target characteristic changing coefficient when the predetermined physical quantity detected by the physical quantity detection device is equal to or greater than a preset, predetermined value.

5. The vehicular damping force control device according to claim 1, further comprising:

roll angle estimation device that estimates a roll angle in the lateral direction of the vehicle body generated as a result of a driver's steering operation for turning the vehicle body; and vertical acceleration detection device that detects acceleration in a vertical direction generated in the vehicle body, wherein the target-characteristic-changing-coefficient calculation device does not calculate the target characteristic changing coefficient when an absolute value of a difference between the roll angle estimated by the roll angle estimation device and the actual roll angle detected by the posture-state-quantity detection device is equal to or greater than a first preset, predetermined value or when an absolute value of the acceleration in the vertical direction of the vehicle body detected by the vertical acceleration detection device is equal to or greater than a second preset, predetermined value.

6. The vehicular damping force control device according to claim 1, further comprising:

actual-characteristic-change determination device for determining whether or not the vehicle starts to travel and enters a state in which the actual roll angle and the actual pitch angle detected by the posture-state-quantity detection device are likely to change, wherein when the actual-characteristic-change determination device determines that the vehicle body is in a state in which the actual characteristic of the vehicle body is likely to change, the target characteristic changing device increases a frequency at which the target characteristic is changed by use of the target characteristic changing coefficient calculated by the target-characteristic-changing-coefficient calculation device.

7. The vehicular damping force control device according to claim 6, wherein the actual-characteristic-change determination device determines that the vehicle body is in a state in which the actual roll angle and the actual pitch angle are likely to change, when a period of time elapsed after an ignition switch of the vehicle body was turned on is equal to less than a preset, predetermined elapsed time, when the target characteristic changing device has not yet changed the target characteristic after a trunk lid of the vehicle body was opened and closed, or when the target characteristic changing device has not yet changed the target characteristic after a door of the vehicle body was opened and closed.

8. The vehicular damping force control device according to claim 1, wherein the total-damping-force distribution device distributes the total damping force calculated by the total-damping-force calculation device in proportion to the predetermined physical quantity detected by the physical quantity detection device such that the damping forces of the shock absorbers disposed on the turning-locus inner side become greater than the damping forces of the shock absorbers disposed on the turning-locus outer side.

9. The vehicular damping force control device according to claim 8, wherein the total-damping-force distribution device distributes the total damping force calculated by the total-damping-force calculation device equally to the shock absorbers disposed on the turning-locus inner side and the shock absorbers disposed on the turning-locus outer side; adds to the damping forces of the shock absorbers disposed on the turning-locus inner side a damping force distribution amount which is proportional to the predetermined physical quantity detected by the physical quantity detection device; and subtracts the damping force distribution amount from the damping forces of the shock absorbers disposed on the turning-locus outer side, whereby the damping forces of the shock absorbers disposed on the turning-locus inner side are made greater than the damping forces of the shock absorbers disposed on the turning-locus outer side.

10. The vehicular damping force control device according to claim 1, wherein the predetermined physical quantity detected by the physical quantity detection device is at least one of a lateral acceleration generated as a result of turning of the vehicle, a yaw rate generated as a result of turning of the vehicle, and an amount of operation of a steering wheel operated by a driver.

11. The vehicular damping force control device according to claim 1, wherein each shock absorber includes an electrical actuator whose operation is electrically controlled so as to change the damping force of the shock absorber; and the damping force control device changes and controls the damping force of each shock absorber by electrically controlling the operation of the electrical actuator.

12. The vehicular damping force control device according to claim 1, wherein the total-damping-force calculation device determines a target pitch angle corresponding to the actual roll angle detected by the posture-state-quantity detection device on the basis of the target characteristic changed by the target characteristic changing device, and calculates a difference between the determined target pitch angle and the actual pitch angle detected by the posture-state-quantity detection device; and in order to control rolling behavior of the vehicle body by synchronizing phases of the actual roll angle and the pitch angle, the total-damping-force calculation device calculates the total damping force, which must be cooperatively generated by the left and right shock absorbers disposed on the front-wheel side and the left and right shock absorbers disposed on the rear-wheel side, such that the calculated difference becomes about zero.

* * * * *